US012546659B2

United States Patent
Nakamura

(10) Patent No.: US 12,546,659 B2
(45) Date of Patent: Feb. 10, 2026

(54) ELECTROCONDUCTIVE THERMAL INSULATING MATERIAL AND INFRARED SENSOR

(71) Applicant: Panasonic Intellectual Property Management Co., Ltd., Osaka (JP)

(72) Inventor: Kunihiko Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 123 days.

(21) Appl. No.: 18/425,874

(22) Filed: Jan. 29, 2024

(65) Prior Publication Data

US 2024/0183718 A1   Jun. 6, 2024

Related U.S. Application Data

(63) Continuation of application No. PCT/JP2022/026883, filed on Jul. 6, 2022.

(30) Foreign Application Priority Data

Aug. 3, 2021   (JP) .................................. 2021-127296

(51) Int. Cl.
    *G01J 5/04*    (2006.01)
    *G01J 5/12*    (2006.01)
    *G01J 5/20*    (2006.01)

(52) U.S. Cl.
    CPC ................. *G01J 5/046* (2013.01); *G01J 5/12* (2013.01); *G01J 5/20* (2013.01)

(58) Field of Classification Search
    CPC ....... G01J 5/046; G01J 5/12; G01J 5/20; G01J 5/023; G01J 1/02; G01J 1/04
    See application file for complete search history.

(56) References Cited

U.S. PATENT DOCUMENTS

| | | | |
|---|---|---|---|
| 8,094,023 B1 | 1/2012 | El-Kady et al. | |
| 10,281,333 B2* | 5/2019 | Takahashi | G01J 5/046 |
| 10,605,667 B2* | 3/2020 | Kawasaki | H10N 10/17 |
| 2017/0047499 A1 | 2/2017 | Hussein | |
| 2017/0069818 A1 | 3/2017 | Mitrovic et al. | |
| 2017/0356806 A1 | 12/2017 | Takahashi et al. | |
| 2019/0178718 A1 | 6/2019 | Kawasaki et al. | |

(Continued)

FOREIGN PATENT DOCUMENTS

| | | |
|---|---|---|
| JP | 2017-223644 A | 12/2017 |
| JP | 2019-105624 A | 6/2019 |
| WO | 2019/225058 A1 | 11/2019 |

OTHER PUBLICATIONS

International Search Report dated Sep. 6, 2022 issued in International Patent Application No. PCT/JP2022/026883, with English translation.

(Continued)

*Primary Examiner* — Seung C Sohn
(74) *Attorney, Agent, or Firm* — Rimon P.C.

(57) ABSTRACT

An electroconductive thermal insulating material includes first domains and at least one second domain. The first domains each have a phononic crystal, and the phononic crystal has holes arranged in plan view. The second domain is a domain formed around the first domain in plan view and having no hole.

9 Claims, 18 Drawing Sheets

(56) References Cited

U.S. PATENT DOCUMENTS

2020/0003625 A1 1/2020 Tambo et al.
2021/0028759 A1 1/2021 Ayazi et al.

OTHER PUBLICATIONS

M. Nomura et al., "Impeded thermal transport in Si multiscale hierarchical architectures with phononic crystal nanostructures", Physical Review B, vol. 91, 205422 (2015), pp. 1-6.

* cited by examiner

ELECTROCONDUCTIVE THERMAL INSULATING MATERIAL AND INFRARED SENSOR

This application is a continuation of PCT/JP2022/026883 filed on Jul. 6, 2022, which claims foreign priority of Japanese Patent Application No. 2021-127296 filed on Aug. 3, 2021, the entire contents of both of which are incorporated herein by reference.

BACKGROUND OF THE INVENTION

1. Field of the Invention

The present disclosure relates to an electroconductive thermal insulating material and an infrared sensor.

2. Description of Related Art

Techniques for enhancing the thermal insulation of members by a phononic crystal have been conventionally known.

For example, US20170047499A1, US20170069818A1, and Nomura et al., "Impeded thermal transport is Si multiscale hierarchical architectures with phononic crystal nanostructures", Physical Review B 91, 205422 (2015) each describe a technique for reducing the thermal conductivity of a material by a predetermined phononic structure such as a structure in which through holes are periodically arranged.

Moreover, JP 2017-223644A describes an infrared sensor including a base substrate having a recess, a thermopile infrared receiver, and a beam. In this infrared sensor, the beam has a thin-film-shaped phononic crystal in which through holes are periodically arranged, and the infrared receiver and the base substrate are separated from each other by the beam. The beam is configured such that the periodicity of the through holes is increased at arbitrary intervals. This achieves an excellent thermal insulation effect throughout the beam.

SUMMARY OF THE INVENTION

The above techniques have room for restudy from the viewpoint of reducing crack growth in a member having a phononic crystal.

Therefore, the present disclosure provides a technique advantageous in reducing crack growth while having a phononic crystal.

The present disclosure provides the following electroconductive thermal insulating material.

An electroconductive thermal insulating material including:
  first domains each having a phononic crystal, the phononic crystal having holes arranged in plan view; and
  at least one second domain formed around the first domain in plan view and having no hole, wherein
  the first domains are divided from each other by the second domain, and
  in plan view, the first domain has a substantially polygonal shape in which at least one interior angle is greater than 90°.

The electroconductive thermal insulating material of the present disclosure is advantageous in reducing crack growth while having a phononic crystal.

Figure 1:
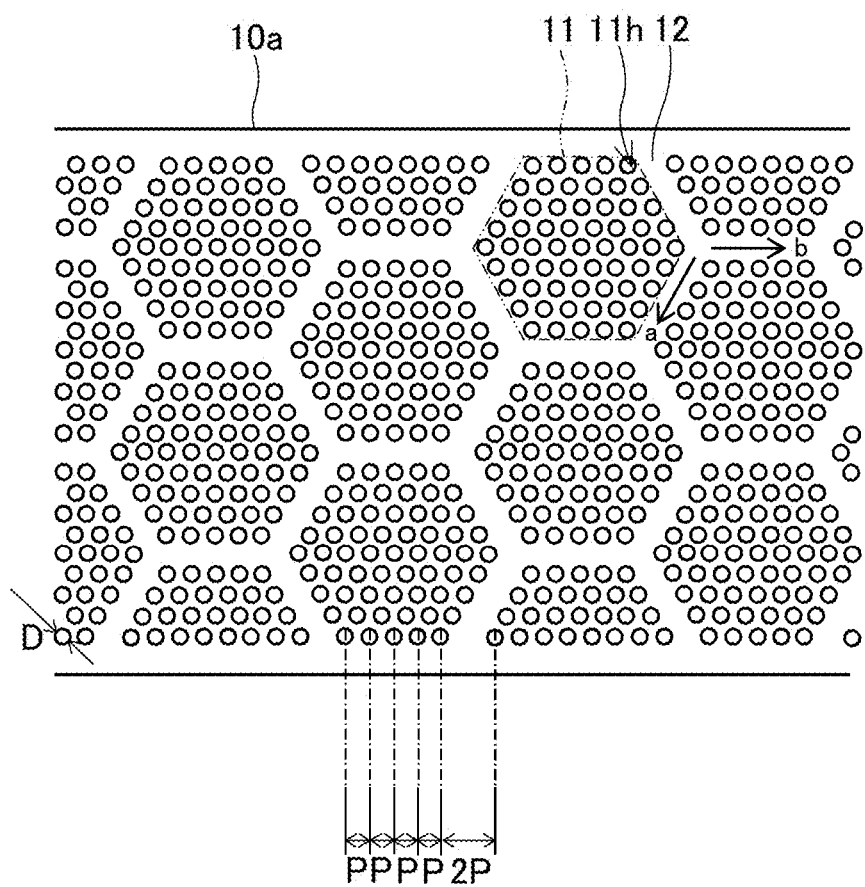
FIG. 1 is a plan view showing an electroconductive thermal insulating material of Embodiment 1.

DETAILED DESCRIPTION (Findings on which the Present Disclosure is Based)

In insulators and semiconductors, heat is carried mainly by lattice vibrations called phonons. A material made of an insulator or a semiconductor has a thermal conductivity determined by the dispersion relation of phonons of the material. The dispersion relation of phonons means the relation between the frequency and the wavenumber, or the band structure. In insulators and semiconductors, the heat-carrying phonons span a wide frequency band from 100 GHz to 10 THz. This frequency band is a thermal band. The thermal conductivity of a material is determined by the dispersion relation of phonons in the thermal band.

In a member having a phononic crystal having holes, the dispersion relation of phonons of the material can be controlled by a periodic structure having the holes. In other words, the phononic crystal can control the thermal conductivity itself of the material. In particular, formation of a phononic band gap (PBG) by the phononic crystal can significantly reduce the thermal conductivity of the material. No phonon can be present in a PBG. Therefore, a PBG falling within the thermal band can serve as a gap for thermal conduction. Moreover, even in a frequency band other than that of a PBG, the PBG makes the slope of the phonon dispersion curve gentle. Such a gentle slope reduces the phonon group velocity and reduces the thermal conduction velocity. These points significantly contribute to a reduction in the thermal conductivity of a member. The thermal conductivity of a member can be reduced, for example, by porosification of the member. This is because the voids introduced by the porosification reduce the thermal conductivity of the member. On the other hand, in a member having a phononic crystal, the thermal conductivity of the material itself can be reduced. This promises a further reduction in the thermal conductivity of the member as compared to mere porosification.

By using a phononic crystal, it is possible to produce an electroconductive thermal insulating material having electroconductivity and a high thermal insulation. Such an electroconductive thermal insulating material can be applied, for example, to an infrared sensor. For example, in an infrared sensor, infrared absorption or radiation by an infrared receiver generates a temperature difference between the temperature of the infrared receiver and the surrounding temperature. For example, in the case where the infrared receiver is supported in a state where the infrared receiver is separated from the substrate, heat radiation to the substrate is suppressed and consequently the temperature difference is less likely to be eliminated. When the two regions between which the temperature difference is generated are connected to each other with either or both of a p-type semiconductor and an n-type semiconductor, an electromotive voltage is generated by the Seebeck effect. Infrared sensing can be achieved by quantifying the relation between the electromotive voltage and the temperature difference and the relation between the temperature difference and the amount of infrared absorption or radiation performed by the infrared receiver.

In the case where either or both of the p-type semiconductor and the n-type semiconductor have a low thermal insulation, the above temperature difference is small and consequently the infrared sensor has a low sensitivity. Therefore, it is important that a member for generating an electromotive voltage by the Seebeck effect should have a high thermal insulation. In addition, to generate an electric current from an electromotive voltage generated by the Seebeck effect, the member is required to have electroconductivity. Therefore, the sensitivity of an infrared sensor can be enhanced, for example, by using an electroconductive thermal insulating material having a phononic crystal to connect the substrate and the infrared receiver of the infrared sensor to each other. Such an electroconductive thermal insulating material can be produced, for example, by forming a phononic crystal as described above in an N-type semiconductor or P-type semiconductor film. In this case, between a joined portion joining the electroconductive thermal insulating material and the infrared receiver and a connected portion connecting the electroconductive thermal insulating material and the substrate, a phononic crystal having holes arranged in plan view is formed. This can enhance the sensitivity of the infrared sensor. It is also assumed that an electroconductive thermal insulating material having a phononic crystal having holes is applied in fields other than the field of infrared sensors.

An electroconductive thermal insulating material having a phononic crystal having holes can be produced, for example, through a thin film forming process. In a phononic crystal having holes, a neck portion that is a solid portion between adjacent holes often has dimensions in the order of nanometers. Thus, when an external force is applied to the material for an electroconductive thermal insulating material in the thin film forming process, crack growth can occur in the neck portion. In this case, the electroconductive thermal insulating material can decrease in electroconductivity. For example, such a member is included in an infrared sensor, the infrared sensor increases in impedance, causing an increase in an impedance mismatch between the infrared sensor and an external circuit. Furthermore, the level of thermal noise is increased, and consequently the infrared sensor can decrease in resolution.

For example, a release process can be performed so that most of an electroconductive thermal insulating material having a phononic crystal having holes is in contact with a cavity. In the release process, various external forces are applied due to the surface tension of an etchant that melts a material immediately below the electroconductive thermal insulating material, vibration of the etchant, blowing of dry air, or other factors. Consequently, the neck portion is prone to crack growth. Moreover, in a thin film formed through a thin film forming process, residual stress can be generated due to the difference in thermal expansion coefficient between the thin film and the material underlying the thin film or other factors. This residual stress is likely to concentrate particularly in the neck portion, and the neck portion is likely to become the origin of crack growth that is due to an external force applied in the manufacturing process for the electroconductive thermal insulating material.

On the other hand, the studies by the inventors have newly found that by arranging a domain having a phononic crystal having holes and a domain having no hole to be in a predetermined relation, it is possible to enhance the mechanical resistance of the electroconductive thermal insulating material against an external force. On the basis of such new findings, the electroconductive thermal insulating material of the present disclosure has been invented.

(Outline of One Aspect According to the Disclosure)

A first aspect of the present disclosure provides the following electroconductive thermal insulating material.

An electroconductive thermal insulating material including:
  first domains each having a phononic crystal, the phononic crystal having holes arranged in plan view; and
  at least one second domain formed around the first domain in plan view and having no hole, wherein
  the first domains are divided from each other by the second domain, and
  in plan view, the first domain has a substantially polygonal shape in which at least one interior angle is greater than 90°.

The above electroconductive thermal insulating material is advantageous in reducing crack growth while having a phononic crystal. In addition, the first domain having the above polygonal shape facilitates the holes of the first domain to be orderly arranged.

In a second aspect of the present disclosure, in the electroconductive thermal insulating material according to the first aspect, in plan view, the first domain may have a shape capable of tessellation. The second aspect facilitates the first domains to be orderly arranged, thereby facilitating the electroconductive thermal insulating material to be uniform in electroconductivity and thermal insulation.

In a third aspect of the present disclosure, in the electroconductive thermal insulating material according to the first or second aspect, in plan view, the first domain may have a substantially obtuse triangular shape, a substantially parallelogrammic shape, or a substantially parallel hexagonal shape. The third aspect further facilitates the holes of the first domain to be orderly arranged.

In a fourth aspect of the present disclosure, in the electroconductive thermal insulating material according to any one of the first to third aspects, in plan view, the first domain may have a substantially hexagonal shape, and the first domains may be arranged in a substantially honeycomb pattern. The fourth aspect further facilitates the holes of the first domain to be orderly arranged, thereby facilitating the electroconductive thermal insulating material to have a high strength.

In a fifth aspect of the present disclosure, in the electroconductive thermal insulating material according to any one of the first to fourth aspects, the holes may be arranged with a periodicity P in plan view, and the first domain may have an area of 25 $P^2$ or more in plan view. The fifth aspect facilitates the phononic crystal to adjust the dispersion relation of phonons to a desired state.

In a sixth aspect of the present disclosure, in the electroconductive thermal insulating material according to any one of the first to fifth aspects, the second domain may include: a base layer formed to be flush with the first domain; and a reinforcing layer disposed on the base layer. The sixth aspect facilitates a high durability to be exhibited against an external force generated in the manufacturing process for the electroconductive thermal insulating material.

A seventh aspect of the present disclosure provides the following infrared sensor.

An infrared sensor including:
  a substrate;
  an infrared receiver; and
  the electroconductive thermal insulating material according to any one of the first to sixth aspects, wherein
  the electroconductive thermal insulating material includes:
    a connected portion connected to at least one selected from the group consisting of the substrate and a member on the substrate; and
    a separated portion separated from the substrate,
    the infrared receiver is joined to the separated portion of the electroconductive thermal insulating material,
    the infrared receiver is supported by the electroconductive thermal insulating material in a state where the infrared receiver is separated from the substrate, and
    the electroconductive thermal insulating material includes, between a joined portion thereof joined to the infrared receiver and the connected portion, the first domain and the second domain.

The seventh aspect facilitates the infrared sensor to be prevented from decreasing in resolution.

In an eighth aspect of the present disclosure, in the infrared sensor according to the seventh aspect,
  the infrared receiver may be a thermopile infrared receiver,
  the electroconductive thermal insulating material may have:
    a first region having a first Seebeck coefficient;
    a second region having a second Seebeck coefficient different from the first Seebeck coefficient; and
    a joining region joining the first region and the second region to each other, and
  the infrared receiver may be joined to the joining region of the electroconductive thermal insulating material.

The eighth aspect facilitates the infrared sensor including the thermopile infrared receiver to be prevented from decreasing in resolution.

In a ninth aspect of the present disclosure, in the infrared sensor according to the seventh aspect,
  the infrared receiver may be a bolometer infrared receiver, and
  the infrared sensor may include:
    a first wiring and a second wiring both electrically connected to the infrared receiver;
    a first signal processing circuit electrically connected to the first wiring; and
    a second signal processing circuit electrically connected to the second wiring.

The ninth aspect facilitates the infrared sensor including the bolometer infrared receiver to be prevented from decreasing in resolution.

In a tenth aspect of the present disclosure, in the infrared sensor according to any one of the seventh to ninth aspects, the first domain and the second domain may be formed throughout the separated portion of the electroconductive thermal insulating material. According to the tenth aspect, the electroconductive thermal insulating material is even less prone to crack growth, thereby further facilitating the infrared sensor to be prevented from decreasing in resolution.

EMBODIMENTS OF THE PRESENT DISCLOSURE

Embodiments of the present disclosure will be described with reference to the drawings. The embodiments described below are each a generic or specific example. The numerical values, shapes, materials, components, arrangement positions of the components, connection forms, process conditions, steps, order of the steps, etc., shown in the following embodiments are examples, and are not intended to limit the present disclosure. Moreover, among the components in the following embodiments, the components that are not recited in the independent claims that represent the broadest concepts are described as optional components. The drawings are schematic and are not necessarily exact illustrations.

Embodiment 1

FIG. 1 shows an electroconductive thermal insulating material 10a of Embodiment 1. As shown in FIG. 1, the electroconductive thermal insulating material 10a includes first domains 11 and at least one second domain 12. The first domains 11 each have a phononic crystal, and the phononic crystal has holes 11h arranged in plan view. The first domain 11 is also referred to as a phononic domain. The second domain 12 is a domain formed around the first domain 11 in plan view and having no hole. The second domain 12 is also referred to as a bulk domain. In the present specification, the "plan view" means viewing of an object from a direction perpendicular to a principal surface of the object. Moreover, the "principal surface" means a surface having the largest area of an object referred to.

Figure 2A:
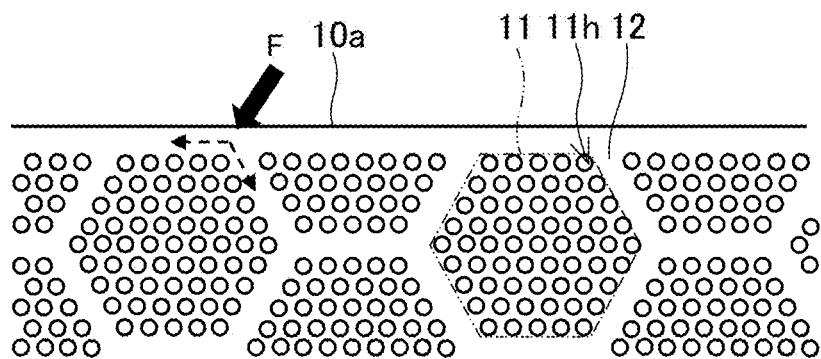
FIG. 2A is a view schematically showing a state of the electroconductive thermal insulating material of Embodiment 1 to which an external force F is applied.
Figure 2B:
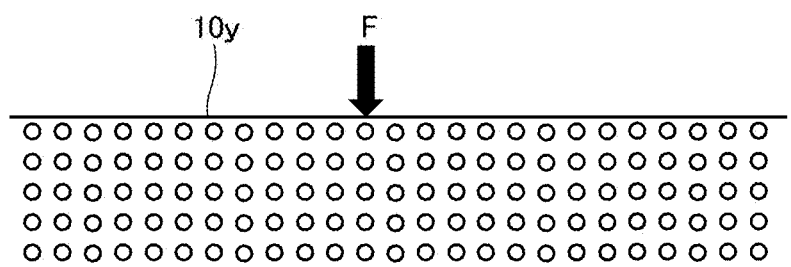
FIG. 2B is a view schematically showing a state of an electroconductive thermal insulating material according to a reference example to which the external force F is applied.

FIG. 2A schematically shows a state of the electroconductive thermal insulating material 10a to which an external force F is applied. FIG. 2B schematically shows a state of an electroconductive thermal insulating material 10y according to a reference example to which an external force F is applied. The entire electroconductive thermal insulating material 10y is formed as a phononic crystal, and the electroconductive thermal insulating material 10y has no domain corresponding to the second domain 12. As shown in FIG. 2B, in the electroconductive thermal insulating material 10y, the hole and its surrounding neck portion of the phononic crystal are prone to a direct influence of the external force F. Accordingly, in the electroconductive thermal insulating material 10y, the neck portion is prone to break, and consequently the adjacent holes are prone to continuous crack generation and growth. In contrast, as shown in FIG. 2A, in the electroconductive thermal insulating material 10a, since the second domain 12 is formed around the first domain 11, mainly the second domain 12 receives the external force F and disperses the external force F as indicated by broken line arrows. Consequently, the hole 11h and its surrounding neck portion of the first domain 11 are less prone to a direct influence of the external force. Therefore, the electroconductive thermal insulating material 10a is less prone to crack growth.

Since the electroconductive thermal insulating material 10a is less prone to crack growth, the electroconductive thermal insulating material 10a is less prone to decrease in electroconductivity. Therefore, for example, applying the electroconductive thermal insulating material 10a to an infrared sensor facilitates the infrared sensor to be prevented from decreasing in resolution caused by an impedance mismatch between the infrared sensor and an external circuit or by an increase in thermal noise.

In the electroconductive thermal insulating material 10a, for example, the first domains 11 are divided from each other by the second domain 12. According to such a configuration, the electroconductive thermal insulating material 10a is even less prone to crack growth.

The electroconductive thermal insulating material 10a is in the form of, for example, a film. The thickness of the electroconductive thermal insulating material 10a is not limited to a specific value. The thickness is, for example, 10 nm or more and 500 nm or less. The electroconductive thermal insulating material 10a has, for example, a rectangular shape in plan view. In FIG. 1, macroscopic heat conduction can occur in the direction of an arrow H. In the electroconductive thermal insulating material 10a, the hole 11h is formed, for example, as a through hole.

As shown in FIG. 1, the phononic crystal of the first domain 11 is a two-dimensional phononic crystal formed by arranging the holes 11h in an in-plane direction of the electroconductive thermal insulating material 10a. The phononic crystal of the first domain 11 is, for example, a single crystal. The holes 11h are arranged in a first direction a and a second direction b in plan view. The second direction b intersects with the first direction. In the first domain 11, the holes 11h are arranged, for example, with a periodicity P. As shown in FIG. 1, the first domains 11 are the same in terms of a diameter D of the holes 11h, and are also the same in terms of the arrangement periodicity P of the holes 11h. The first domains 11 may differ from each other in terms of the diameter D. The first domains 11 may differ from each other in terms of the periodicity P. For example, in the case where a first hole randomly selected from the holes 11h and a second hole that is another hole are present at a distance corresponding to the periodicity P from each other, the first hole and the second hole belong to the same first domain 11.

The periodicity P is not limited to a specific value. The periodicity P is, for example, 1 nm or more and 300 nm or less. The wavelength of heat-carrying phonons ranges mainly from 1 nm to 300 nm. Accordingly, in the case where the periodicity P falls within such a range, the electroconductive thermal insulating material 10a is likely to have a high thermal insulation.

The ratio D/P of the diameter D to the periodicity P is not limited to a specific value. For example, the ratio D/P satisfies a requirement D/P≥0.5. Consequently, the electroconductive thermal insulating material 10a is more likely to have a high thermal insulation. The ratio D/P is, for example, less than 0.9. Consequently, the distance between the adjacent holes 11h is maintained within a desired range. The diameter D is the diameter of the hole 11h in plan view. For example, in the case where the hole 11h is a circle in plan view, the diameter D is the diameter of the circle. The hole 11h may have a shape other than a circle in plan view. In this case, the diameter D is the diameter of an imaginary circle having the same area as the opening area of the hole 11h in plan view.

The shape of the first domain 11 in plan view is not limited to a specific shape. The shape of the first domain 11 can be specified, for example, by determining a polygon having the minimum area surrounding the holes 11h belonging to the first domain 11 while taking the periodicity P into consideration. In this determination, the sides of the polygon are each selected to be in contact with the holes. As shown in FIG. 1, in plan view, the first domain 11 has a substantially polygonal shape in which at least one interior angle is greater than 90° and less than 180°. Such a configuration facilitates the holes 11h to be orderly arranged, as described later. The substantially polygonal shape encompasses a polygonal shape and a shape that can be regarded as a polygonal shape. For example, a particular shape in which a portion of sides is a curved line instead of a straight line can be regarded as a polygonal shape.

In plan view, the first domain 11 has, for example, a shape capable of tessellation. This case facilitates the first domains 11 to be orderly arranged, thereby facilitating the electroconductive thermal insulating material 10a to be uniform in electroconductivity and thermal insulation.

In plan view, the first domain 11 has, for example, a substantially obtuse triangular shape, a substantially parallelogrammic shape, or a substantially parallel hexagonal shape. Such a configuration further facilitates the holes 11h to be orderly arranged. The obtuse triangular shape is a triangle in which one interior angle is greater than 90°.

Figure 3:
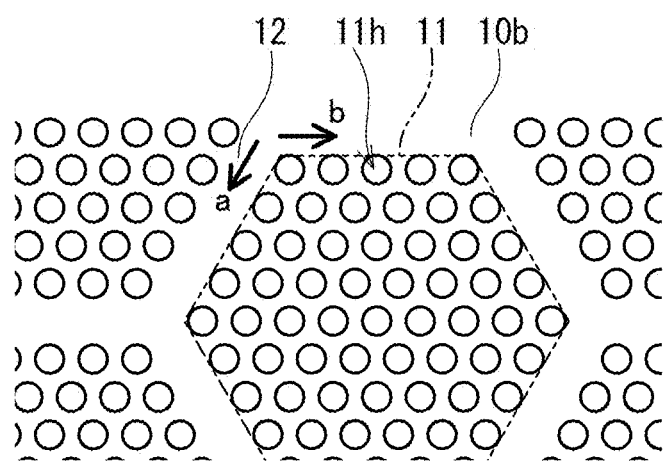
FIG. 3 is a plan view showing another example of the electroconductive thermal insulating material.

The first domain 11 may have a regular polygonal shape in plan view. FIG. 3 shows an electroconductive thermal insulating material 10b that is another example of the electroconductive thermal insulating material of Embodiment 1. As shown in FIG. 3, in the electroconductive thermal insulating material 10b, the first domain 11 has a regular hexagonal shape. The regular hexagon has interior angles each measuring 120°, which is greater than 90°. This facilitates the holes 11h to be orderly arranged in the electroconductive thermal insulating material 10b. In addition, in plan view of the electroconductive thermal insulating material 10b, the first domains 11 are likely to be uniformly arranged.

The area of each of the first domains 11 in plan view is not limited to a specific value. Each of the first domain 11 has an area of, for example, 25 $P^2$ or more in plan view. The first domain 11 having an area of 25 $P^2$ or more facilitates the phononic crystal to adjust the dispersion relation of phonons to a desired state. In FIG. 1, each of the first domains 11 has an area of 25 $P^2$ or more.

The shape of the second domain 12 in plan view is not limited to a specific shape as long as the second domain 12 is formed around the first domain 11. In the electroconductive thermal insulating material 10a shown in FIG. 1, in plan view, the second domain 12 is formed along the first domain 11 having a square shape so as to be in a lattice pattern. The width of the second domain 12, for example, is constant in the longitudinal direction of the second domain 12. The width of the second domain 12, for example, may vary in the longitudinal direction of the second domain 12. For example, in the case where the first domain 11 has a regular hexagonal shape, the second domain 12 can be formed to surround the first domain 11 along the sides of the regular hexagon. In plan view, the electroconductive thermal insulating material 10a may include the single continuous second domain 12 or a plurality of the second domains 12.

In plan view of a pair of adjacent first domains 11, the minimum value of the center-to-center distance between the hole 11h of one first domain 11 and the hole 11h of the other first domain 11 is not limited to a specific value. In the example shown in FIG. 1, the minimum value is, for example, 2P. According to such a configuration, in plan view of the electroconductive thermal insulating material 10a, the second domain 12 having no phononic crystal is likely to have a small area, and consequently the electroconductive thermal insulating material 10a is likely to exhibit a higher thermal insulation.

By adjusting the above minimum value so that the second domain 12 does not have an excessively large area, the following advantage is exhibited as well. For example, a film produced through a thin film forming process generally has residual stress. For example, when a material underlying the film is removed to support the film in contact with the resulting cavity, the film tends to release the residual stress. For example, in the case where the film forms a bent beam, stress concentration occurs in the bent portion of the beam and stress relaxation occurs in other portions. In contrast, in the case where the film forms a double-supported beam or has a structure in which the entire periphery of the film is restrained, the stress of the film is less likely to be released. Focusing on the details of the film, in the case where the film has a phononic domain and a bulk domain, the stress of the bulk domain is likely to be relaxed. Conversely, residual stress corresponding to the stress relaxed is likely to be concentrated and superposed in the neck portion of the phononic domain. Consequently, the neck portion of the phononic domain is likely to become the origin of crack growth due to an external force applied during the thin film forming process. On the other hand, in the case where the above minimum value is adjusted so that the second domain 12 does not have an excessively large area, the neck portion of the first domain 11, which is a phononic domain, is less prone to stress concentration, and consequently less prone to crack growth.

Figure 4A:
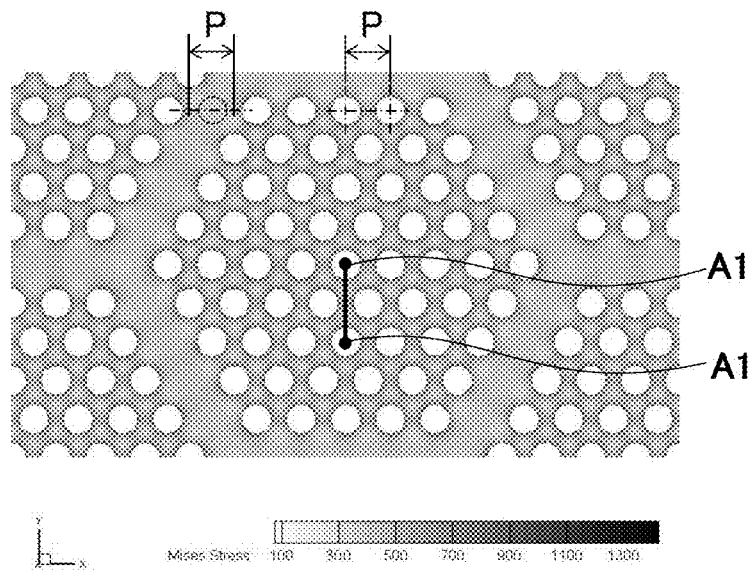
FIG. 4A is a view showing an example of the stress distribution of an electroconductive thermal insulating material.
Figure 4B:
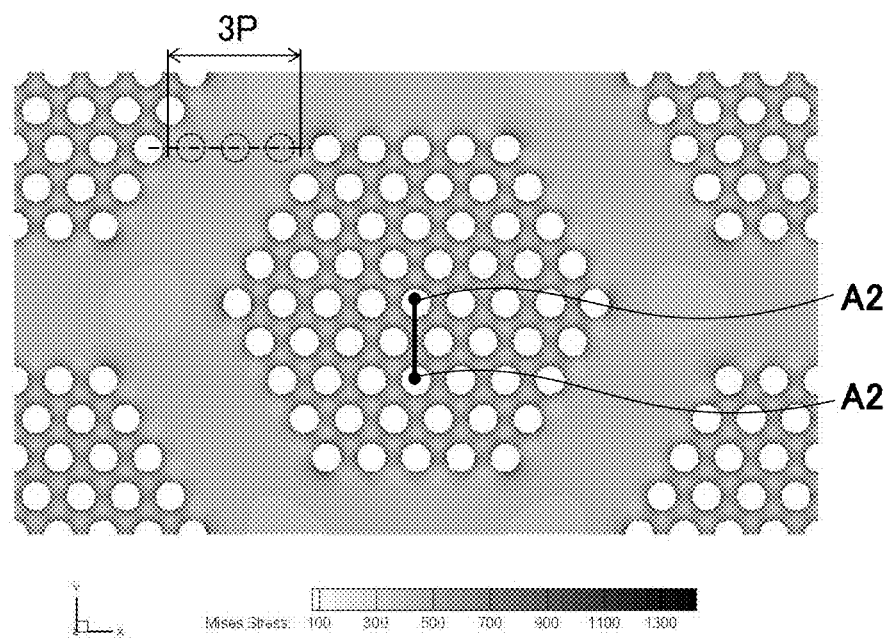
FIG. 4B is a view showing another example of the stress distribution of an electroconductive thermal insulating material.

FIG. 4A and FIG. 4B each show an example of the stress distribution of an electroconductive thermal insulating material. In this electroconductive thermal insulating material, regular hexagonal phononic domains are formed. The stress distribution of the electroconductive thermal insulating material is analyzed by the finite element method. The electroconductive thermal insulating material shown in FIG. 4A is a film formed along a plane (XY plane), and has through holes arranged with the periodicity P. In this electroconductive thermal insulating material, three close through holes of the respective three adjacent phononic domains correspond in position to the vertices of a regular triangle. In the example shown in FIG. 4A, as indicated by broken lines, a bulk domain is formed in such a manner that one row of the through holes arranged is omitted, and the bulk domain has a width of P. The phononic domain has a regular hexagonal shape in plan view. The bulk domain is formed along the sides of the regular hexagonal phononic domain. In FIG. 4A, periodic boundary conditions are applied to the four outer peripheral sides of the rectangular region in a finite element analysis, where the rectangular region shown FIG. 4A is arranged infinitely along the plane (XY plane). It is assumed in FIG. 4A that the tensile stress in the x direction remaining in the electroconductive thermal insulating material is 700 MPa, and the tensile stress in the y direction remaining in the electroconductive thermal insulating material is 700 MPa. For example, according to the above release process, at the same time when the electroconductive thermal insulating material comes into contact with a cavity, stress relaxation and stress concentration occur, causing a new stress distribution in the electroconductive thermal insulating material. FIG. 4A shows the stress distribution of the electroconductive thermal insulating material in this state. The value of the von Mises stress in the electroconductive thermal insulating material is represented in grayscale. In the example shown in FIG. 4A, the through hole has a diameter of 75 nm, and the arrangement periodicity P of the through holes is 100 nm. The electroconductive thermal insulating material shown in FIG. 4B is configured in the same manner as the electroconductive thermal insulating material shown in FIG. 4A except the change in the width of the bulk domain to 3P.

Figure 4C:
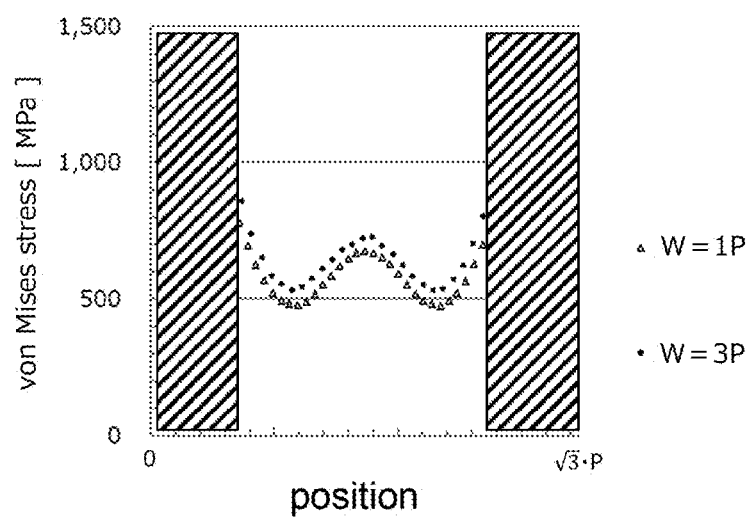
FIG. 4C is a graph showing the stress distribution of the electroconductive thermal insulating materials taken along a line segment A1-A1 in FIG. 4A and a line segment A2-A2 in FIG. 4B.

FIG. 4C shows the von Mises stress distribution of the electroconductive thermal insulating materials taken along a line segment A1-A1 in FIG. 4A and a line segment A2-A2 in FIG. 4B. In FIG. 4C, plotting with a triangular shape corresponds to FIG. 4A, and plotting with a circular shape corresponds to FIG. 4B. The horizontal axis of the graph of FIG. 4C represents the y-coordinate, where the origin corresponds to one end of the line segment A1-A1 in FIG. 4A and one end of the line segment A2-A2 in FIG. 4B. The line segment A1-A1 and the line segment A2-A2 each connect the centers of the through holes in plan view, and each have a length of $3^{0.5}$ P. In FIG. 4C, the rectangular portions provided with a hatched pattern correspond to the through holes. As shown in FIG. 4C, it is understood that the increase in the width of the bulk domain from P to 3P increases stress applied to the neck portion of the phononic domain.

In plan view, the shortest center-to-center distance between the through holes of two adjacent first domains 11 is n×P, where n is a positive real number, and n is, for example, 2. The second domain 12 is disposed between two adjacent first domains 11, and the second domain 12 has a width corresponding to the periodicity P.

As shown in FIG. 1, in plan view of the electroconductive thermal insulating material 10a, the first domains 11 are arranged, for example, in a predetermined direction. For example, in plan view of the electroconductive thermal insulating material 10a, the first domains 11 are arranged in the first direction a and the second direction b.

As shown in FIG. 1, in the electroconductive thermal insulating material 10a, the first domain 11 has, for example, a substantially hexagonal shape in plan view. In addition, the first domains 11 are arranged in a substantially honeycomb pattern. Such a configuration further facilitates the holes of the first domain 11 to be orderly arranged, thereby facilitating the electroconductive thermal insulating material 10a to have a high strength. The substantially honeycomb pattern encompasses a honeycomb pattern and an arrangement pattern that can be regarded as a honeycomb pattern. For example, a particular pattern in which a portion of a substantially hexagonal shape arrangement is not regular can be regarded as a honeycomb pattern.

In the microscopic sense, the presence of the second domain 12 in the electroconductive thermal insulating material 10a reduces the thermal insulation of the electroconductive thermal insulating material 10a. In the macroscopic sense, however, adjustment of the dimensional design of the second domain 12 can achieve electroconductivity and a high thermal insulation of the electroconductive thermal insulating material 10a.

Figure 5A:
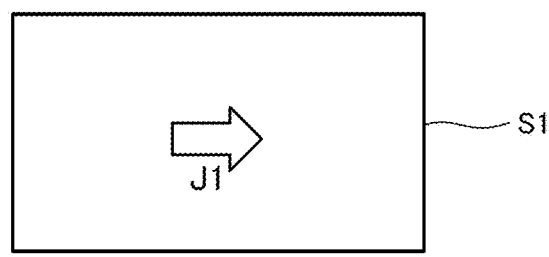
FIG. 5A is a plan view showing a sample film of a silicon material having no hole.

FIG. 5A is a plan view showing a sample film S1 of a silicon material having no hole. The following discusses the flow of electricity and heat in the direction of an arrow J1 shown in FIG. 5A. The electrical conductivity and thermal conductivity of the sample film S1 in the direction of the arrow J1 are $3.33 \times 10^4$ S/m and $1.48 \times 10^2$ W/(m·K), respectively. In the present specification, the electrical conductivity and thermal conductivity mean values at 25° C.

Figure 5B:
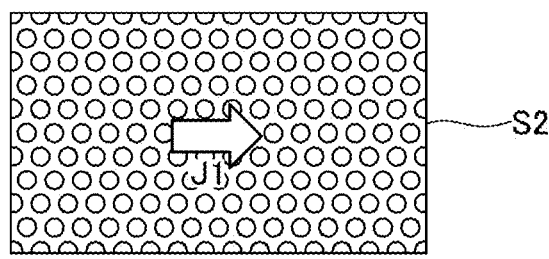
FIG. 5B is a plan view showing a sample film of a silicon material having a phononic crystal.

FIG. 5B is a plan view showing a sample film S2 entirely formed of a phononic crystal. The electrical conductivity and thermal conductivity of the sample film S2 in the direction of the arrow J1 are 0.33 times the electrical conductivity of the sample film S1 and 0.014 times the thermal conductivity of the sample film S1, respectively.

Figure 5C:
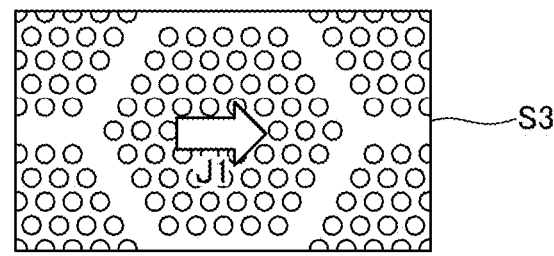
FIG. 5C is a plan view showing a sample film of a silicon material having a regular hexagonal phononic domain and a bulk domain.

FIG. 5C is a plan view showing a sample film S3 having the phononic domain and the bulk domain shown in FIG. 4A. The electrical conductivity and thermal conductivity of the sample film S3 in the direction of the arrow J1 are 0.41 times the electrical conductivity of the sample film S1 and 0.11 times the thermal conductivity of the sample film S1, respectively. Owing to the presence of the bulk domain, the electrical conductivity and thermal conductivity of the sample film S3 in the direction of the arrow J1 are higher than the electrical conductivity and thermal conductivity of the sample film S2 in the direction of the arrow J1, respectively.

Figure 5D:
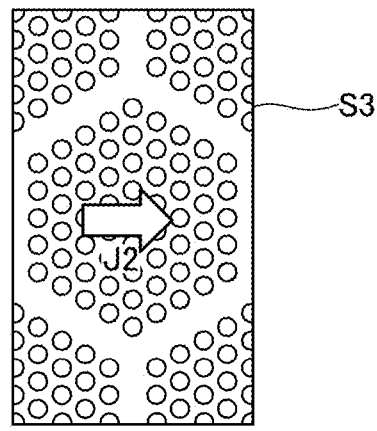
FIG. 5D is a plan view showing the sample film of the silicon material having the regular hexagonal phononic domain and the bulk domain.

FIG. 5D is a plan view showing a state of the sample film S3 rotated by 90°. The direction of an arrow J2 is orthogonal to the direction of the arrow J1. The electrical conductivity and thermal conductivity of the sample film S3 in the direction of the arrow J2 are 0.41 times the electrical conductivity of the sample film S1 and 0.10 times the thermal conductivity of the sample film S1, respectively. The electrical conductivity and thermal conductivity of the sample film S3 in the direction of the arrow J2 are substantially the same as the electrical conductivity and thermal conductivity of the sample film S3 in the direction of the arrow J1, respectively.

For example, by replacing the sample film S1 with the sample film S3 having a width 2.4 times the width of the sample film S1, it is possible to adjust the electrical resistance of the sample film and the thermal conductance of the sample film to 1 time and 0.24 times, respectively. For example, the sensitivity of an infrared sensor is inversely proportional to thermal conductance. In a thermopile infrared sensor, the electromotive voltage with respect to the power of infrared light to be received is inversely proportional to thermal conductance. Noise generated by an infrared sensor is proportional to electrical resistance raised to the power of one-half. In a thermopile infrared sensor, thermal noise of a thermopile element is proportional to electrical resistance raised to the power of one-half. Accordingly, for example, in an infrared sensor, by replacing the sample film S1 with the sample film S3 having a width 2.4 times the width of the sample film S1, it is possible to improve the sensitivity by as high as 4.1 times without changing the noise magnitude. In addition, owing to the bulk domain of the sample film S3, it is possible to suppress crack growth caused by an external force generated in the manufacturing process for the sample film S3.

As shown in FIG. 1, in the electroconductive thermal insulating material 10a, for example, the first domains 11 are the same in terms of the diameter D of the holes 11h, and are also the same in terms of the arrangement periodicity P of the holes. In addition, the second domain 12 is formed, for example, to have periodicity in a two-dimensional direction. According to such a configuration, the electroconductive thermal insulating material 10a can be configured as a member that is mechanically, thermally, and electrically uniform from a macro perspective.

Figure 6A:
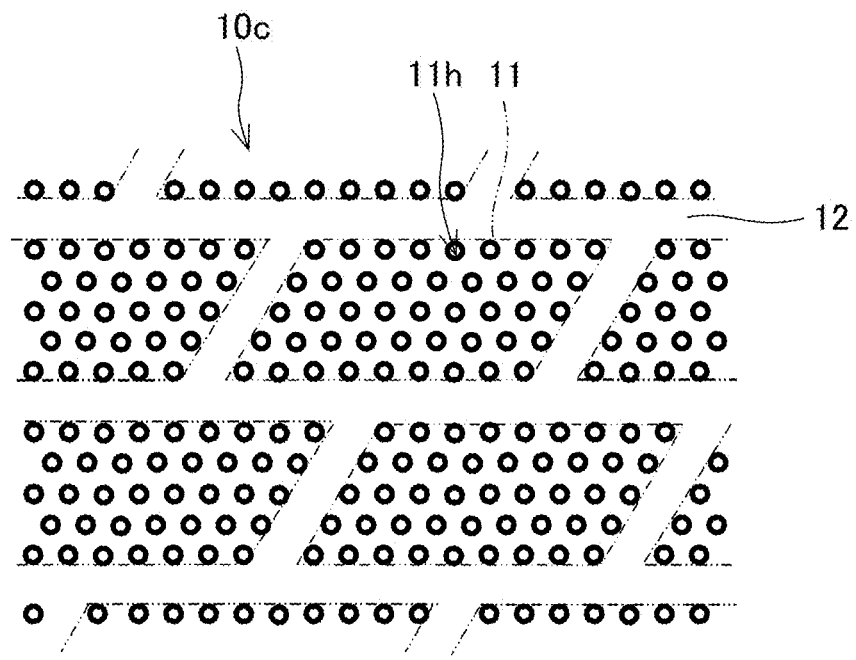
FIG. 6A is a plan view showing still another example of the electroconductive thermal insulating material.
Figure 6B:
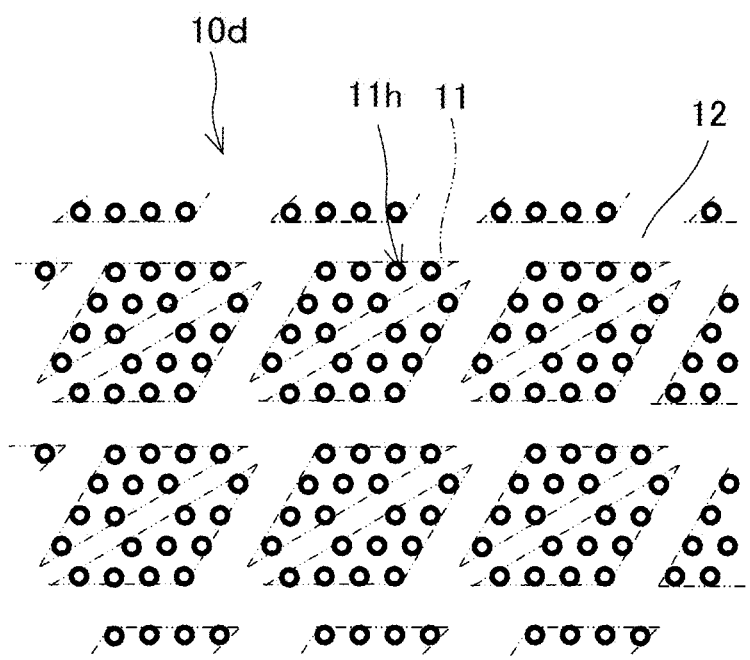
FIG. 6B is a plan view showing yet another example of the electroconductive thermal insulating material.

FIG. 6A and FIG. 6B respectively show electroconductive thermal insulating materials 10c and 10d that are each still another example of the electroconductive thermal insulating material of Embodiment 1. As shown in FIG. 6A, in the electroconductive thermal insulating material 10c, the first domain 11 has a parallelogrammic shape in plan view. Two first domains 11 adjacent to each other in a direction parallel to one pair of parallel sides of the first domain 11 have the respective pairs of parallel sides extending on the same straight lines. On the other hand, two first domains 11 adjacent to each other in a direction parallel to the other pair of parallel sides of the first domain 11 have the respective pairs of parallel sides extending apart from each other. As shown in FIG. 6B, in the electroconductive thermal insulating material 10d, the first domain 11 has an obtuse triangular shape in plan view. In the electroconductive thermal insulating material 10d, two adjacent first domains 11 have the respective opposite sides facing an interior angle greater than 90° that extend in parallel to face each other. Alternatively, one of the sides making the interior angle in one of the two adjacent first domains 11 and one of the sides making the interior angle in the other adjacent first domain 11 extend in parallel to face each other. In the electroconductive thermal insulating materials 10c and 10d, the holes 11h are more easily arranged orderly.

Figure 7A:
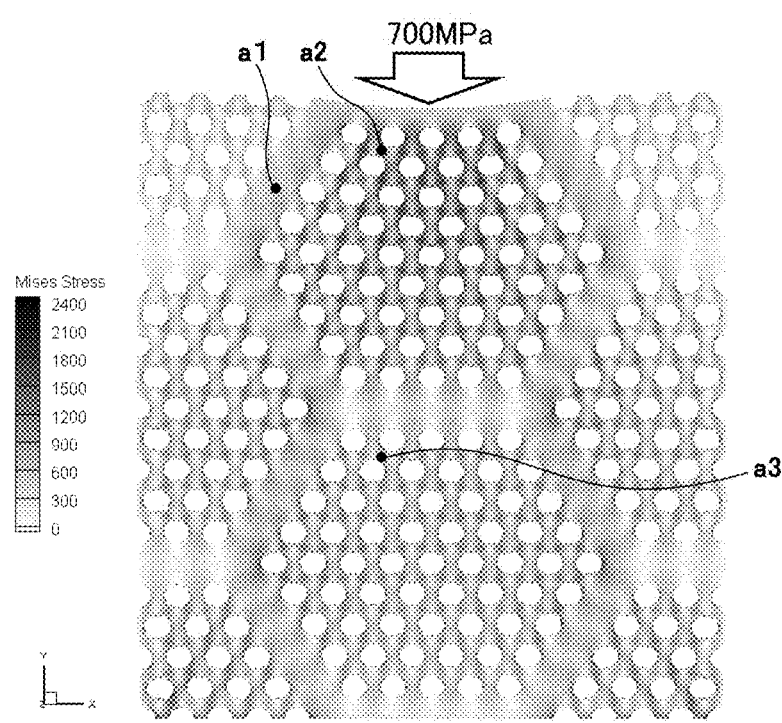
FIG. 7A is a view showing strain and stress distribution in application of an external force to a model having a regular hexagonal phononic domain.
Figure 7B:
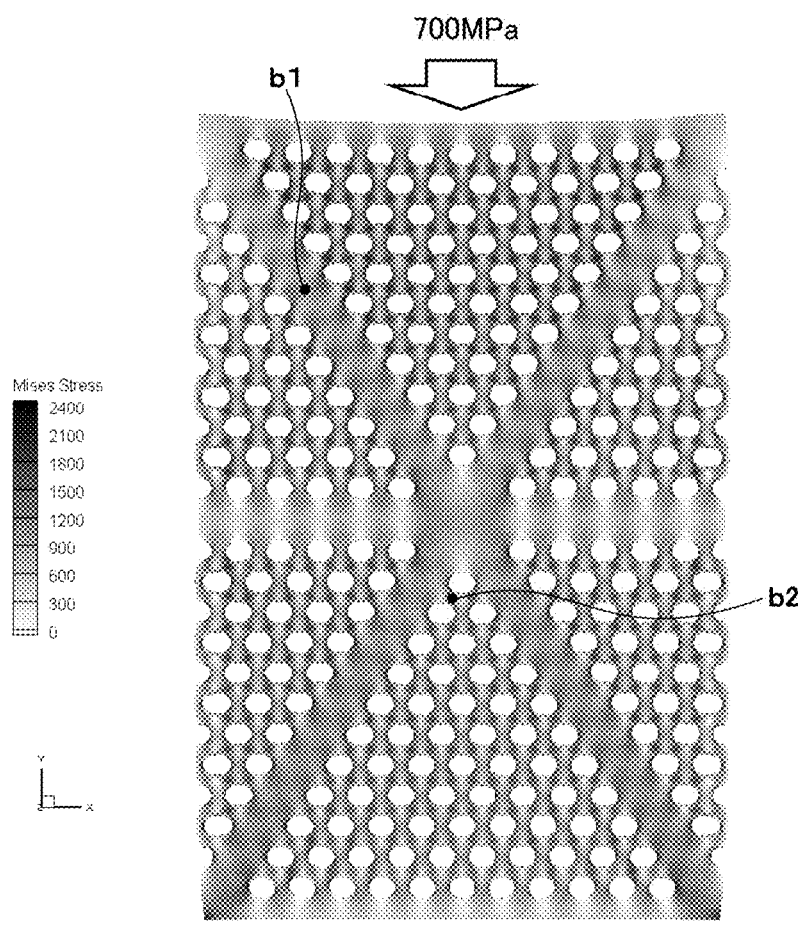
FIG. 7B is a view showing strain and stress distribution in application of an external force to a model having a regular triangular phononic domain.

As described above, the shape of the first domain 11 in plan view is not limited to a specific shape. FIG. 7A is a view showing strain and stress distribution in application of an external force to a model having a regular hexagonal phononic domain. FIG. 7B is a view showing strain and stress distribution in application of an external force to a model having a regular triangular phononic domain.

In the rectangular model shown in each of FIG. 7A and FIG. 7B, the base of the rectangular outer periphery is the fixed side, and a stress of 700 MPa is applied to the upper side of the model in the direction of an arrow. In each of FIG. 7A and FIG. 7B, the von Mises stress distribution in this state is represented in grayscale. In this model, the residual stress before the application of a stress of 700 MPa is set to zero. Note that the amounts of strain expressed in FIG. 7A and FIG. 7B are exaggerated for convenience of description. According to FIG. 7B, the bulk domain serves as an X-brace, causing a high value of the von Mises stress against the applied stress. Moreover, even in the neck portion of the phononic domain away from the upper side, the value of the von Mises stress is high. For example, in FIG. 7B, the von Mises stress at a point b1 is 1260 MPa, and the von Mises stress at a point b2 is 1830 MPa. In contrast, according to FIG. 7A, the value of the von Mises stress is low as a whole compared to that in FIG. 7B, and stress concentration relatively occurs only in the neck portion surrounding the through hole that is relatively close to the application point of the external force. For example, in FIG. 7A, the von Mises stress at a point a1 is 730 MPa, the von Mises stress at a point a2 is 1800 MPa, and the von Mises stress at a point a3 is 1340 MPa.

The model shown in FIG. 7A is inferred to be likely to disperse the energy of an external force by strain. In contrast, the model shown in FIG. 7B is inferred to be likely to exhibit a high rigidity against an external force by the bulk domain serving as a brace. In accordance with factors such as the magnitude of an external force applied to the electroconductive thermal insulating material 10a, the frequency of the external force, and the toughness of the material, a determination can be made as to which of the models the electroconductive thermal insulating material 10a is to be brought close to for design. In the case where the electroconductive thermal insulating material 10a is applied to an infrared sensor, the electroconductive thermal insulating material 10a can be designed in view of the yield of the prototype of the infrared sensor based on each of the models.

The method for manufacturing the electroconductive thermal insulating material 10a is not limited to a specific method. For example, block copolymer (BCP) lithography can be used to manufacture the electroconductive thermal insulating material 10a. Block copolymer lithography is advantageous in forming through holes with a periodicity P of 1 nm or more and 100 nm or less in a film such as a silicon film.

Figure 8:
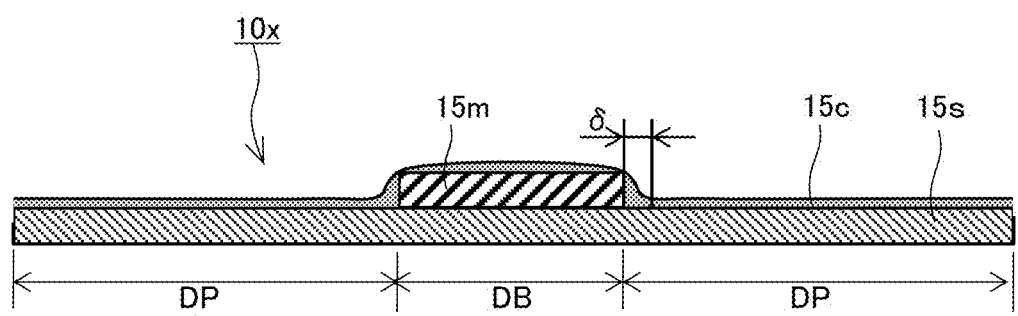
FIG. 8 is a cross-sectional view showing a state in a portion of a manufacturing process for the electroconductive thermal insulating material.

FIG. 8 is a cross-sectional view showing a state in a portion of a manufacturing process for the electroconductive thermal insulating material 10a. A preprocessed material 10x in this state includes a no-hole film 15s, a coating 15c, and a mask 15m. The no-hole film 15s is, for example, a silicon film, and has a portion DP to be the first domain 11 and a portion DB to be the second domain 12. In the preprocessed material 10x, the mask 15m is disposed on the portion DB. The material for the mask 15m is not limited to a specific material. The material for the mask 15m is, for example, silicon oxide or alumina. The coating 15c is formed by applying a BCP solution onto the no-hole film 15s and the mask 15m and curing the resulting coating film. The coating 15c has a fine periodicity pattern. This periodicity pattern serves as the mask, and thus through holes are formed in the lower no-hole film by dry etching or the like.

At the application time of the BCP solution, the thickness of the BCP solution applied is less likely to be uniform due to a step caused by the thickness of the mask 15m. For example, the BCP applied onto the upper portion of the mask 15m decreases in thickness toward the outer edge of the mask 15m. This state is also called step disconnection. In addition, near the end face of the mask 15m on the surface of the no-hole film 15s, BCP aggregation occurs, causing an increase in the thickness of the coating film. In the portion having a large thickness of the coating film, the alignment of the BCP molecules becomes disorder, and consequently the above periodicity pattern can be disturbed. For example, in the direction parallel to the surface of the no-hole film 15s, a portion of the coating film at a distance shorter than δ from the end face of the mask 15m has a large thickness due to the influence of the BCP aggregation.

The above distance δ being short is advantageous in forming, throughout the first domain 11, the holes 11h of the electroconductive thermal insulating material 10a so as to be in a desired state. In the case where the first domain 11 has a polygonal shape in plan view in which an interior angle is an obtuse angle, the distance δ is likely to be short compared to that in the case where the interior angle is an acute angle.

For example, in the case where the first domain 11 is formed in a regular hexagonal shape in plan view as in the model shown in FIG. 7A, the mask 15m extends along the sides of the regular hexagon. In contrast, in the case where the first domain 11 is formed in a regular triangular shape in plan view as in the model shown in FIG. 7B, the mask 15m extends along the sides of the regular triangle. In the case where the first domain 11 is formed in a regular hexagonal shape in plan view, the distance δ is likely to be short compared to that in the case where the first domain 11 is formed in a regular triangular shape in plan view. The regular triangle has interior angles each measuring 60°, whereas the regular hexagon has interior angles each measuring 120°. In the case where the first domain 11 is formed in a regular hexagonal shape in plan view, BCP aggregation is less likely to occur on two adjacent sides of the mask 15m that are formed in accordance with the interior angle of 120°, and consequently the distance δ is likely to be short.

Figure 9:
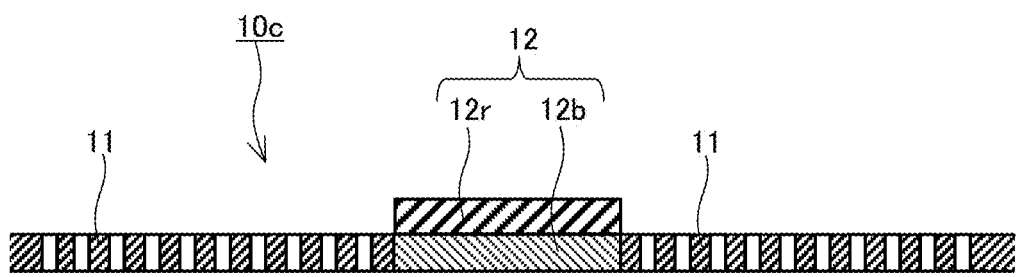
FIG. 9 is a cross-sectional view showing the still another example of the electroconductive thermal insulating material.

FIG. 9 shows the electroconductive thermal insulating material 10c that is the still another example of the electroconductive thermal insulating material of Embodiment 1. In the electroconductive thermal insulating material 10c, the second domain 12 includes a base layer 12b and a reinforcing layer 12r. The base layer 12b is formed to be flush with the first domain 11. The reinforcing layer 12r is disposed on the base layer. According to such a configuration, the second domain 12 is likely to have a high rigidity. This further facilitates the second domain 12 to protect the first domain 11 against an external force, and therefore a high durability can be exhibited against an external force generated in the manufacturing process for the electroconductive thermal insulating material 10c. For example, in the electroconductive thermal insulating material 10c, the above mask 15m may remain as the reinforcing layer 12r.

Embodiment 2

Figure 10:
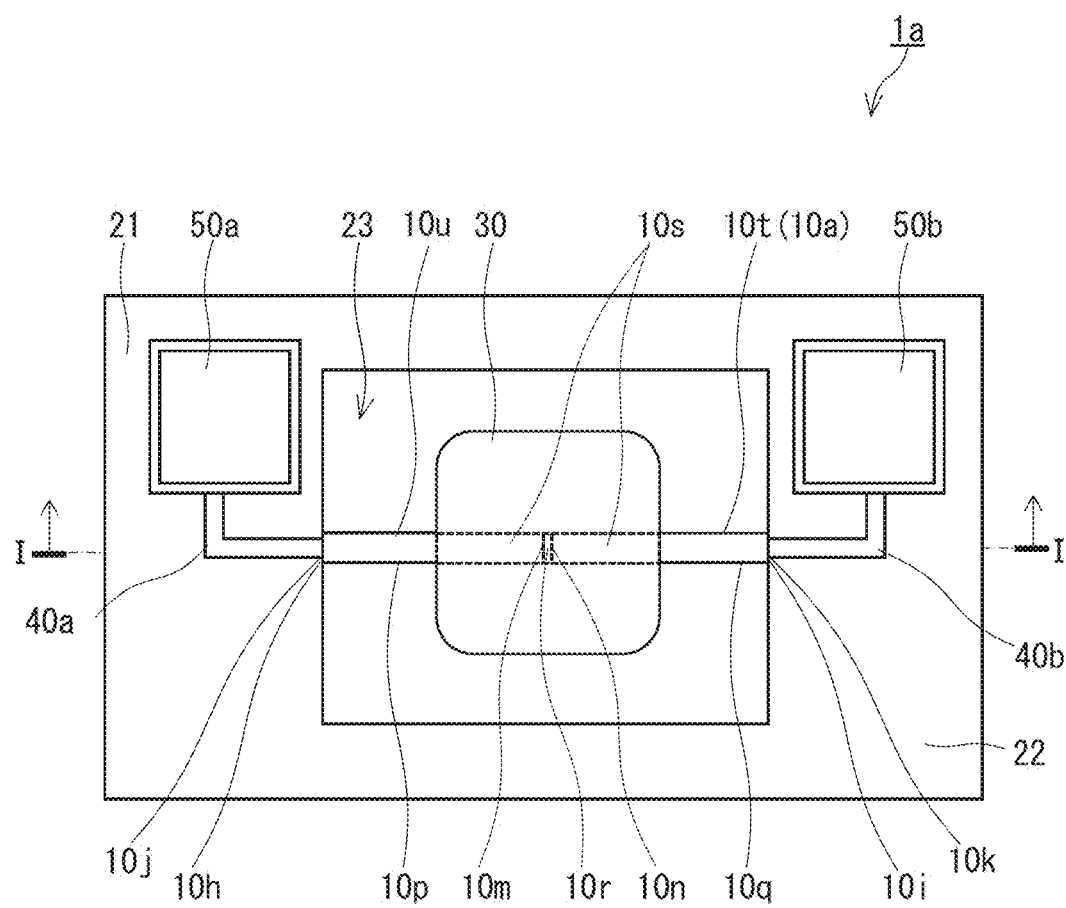
FIG. 10 is a plan view showing an infrared sensor of Embodiment 2.
Figure 11:
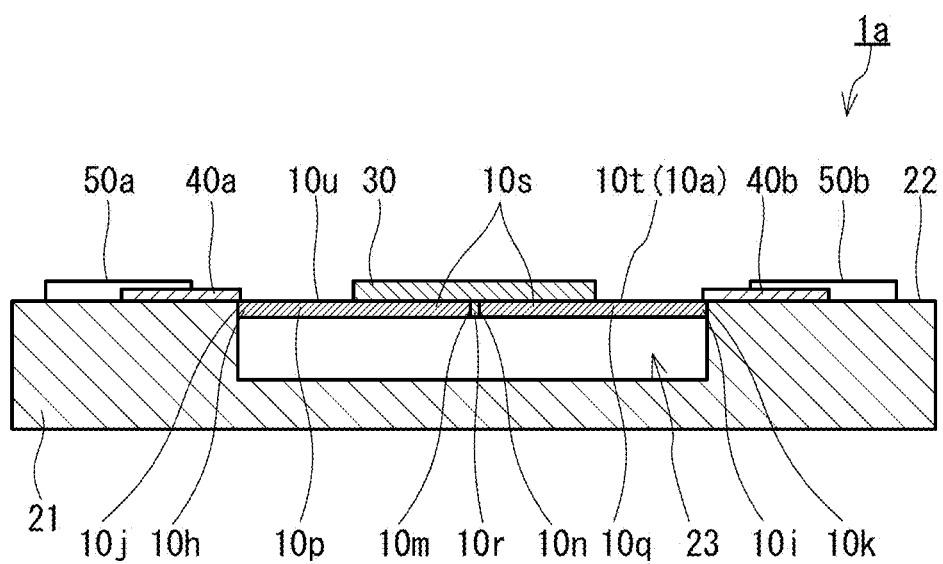
FIG. 11 is a cross-sectional view of the infrared sensor taken along a line I-I in FIG. 10.

FIG. 10 and FIG. 11 show an infrared sensor 1a according to Embodiment 2. FIG. 10 is a plan view of the infrared sensor 1a, and FIG. 11 is a cross-sectional view of the infrared sensor 1a taken along a line I-I in FIG. 10. The infrared sensor 1a includes a substrate 21, an infrared receiver 30, and the electroconductive thermal insulating material 10a. The electroconductive thermal insulating material 10a has connected portions 10h and 10i and a separated portion 10u. The connected portions 10h and 10i are each connected to at least one selected from the group consisting of the substrate 21 and a member on the substrate 21. The separated portion 10u is separated from the substrate 21. The infrared receiver 30 is joined to the separated portion 10u of the electroconductive thermal insulating material 10a. The infrared receiver 30 is supported by the electroconductive thermal insulating material 10a in a state where the infrared receiver 30 is separated from the substrate 21. The electroconductive thermal insulating material 10a includes, between a joined portion 10s joined to the infrared receiver 30 and each of the connected portions 10h and 10i, the first domain 11 and the second domain 12.

As described above, since the electroconductive thermal insulating material 10a is less prone to crack growth, the electroconductive thermal insulating material 10a is less prone to decrease in electroconductivity. This, for example, facilitates the infrared sensor 1a to be prevented from decreasing in resolution caused by an impedance mismatch between the infrared sensor 1a and an external circuit or by an increase in thermal noise.

In the infrared sensor 1a, the infrared receiver 30 is, for example, a thermopile infrared receiver. The electroconductive thermal insulating material 10a has a first region 10p having a first Seebeck coefficient, a second region 10q having a second Seebeck coefficient different from the first Seebeck coefficient, and a joining region 10r joining the first region 10p and the second region 10q to each other. The infrared receiver 30 is joined to the joining region 10r of the electroconductive thermal insulating material 10a.

As shown in FIG. 10, the infrared sensor 1a further includes, for example, a first signal processing circuit 50a, a second signal processing circuit 50b, a first wiring 40a, and a second wiring 40b. The first signal processing circuit 50a and the second signal processing circuit 50b are disposed on the substrate 21.

In the infrared sensor 1a, the electroconductive thermal insulating material 10a forms, for example, a beam 10t. The both end portions in the longitudinal direction of the beam 10t define the connected portions 10h and 10i. The infrared receiver 30 is joined to a portion between the both end portions of the beam 10t, specifically, a portion near the center of the beam 10t. The beam 10t is a double-supported beam.

The substrate 21 has, in an upper surface 22, a recess 23 that is open. In plan view, the recess 23 has a larger area than the infrared receiver 30 has. In addition, in plan view, the infrared receiver 30 is surrounded by the outer edge of the recess 23. The recess 23 is positioned between the infrared receiver 30 together with the beam 10t and the surface of the substrate 21. The infrared receiver 30 and the beam 10t are suspended above the recess 23 of the substrate 21. The both end portions in the longitudinal direction of the beam 10t are, for example, connected to the side walls of the recess 23. The beam 10t has, for example, a single-layer structure. The beam 10t may have a multi-layer structure.

The first region 10p and the second region 10q, which are joined to each other by the joining region 10r, constitute a thermocouple element. One end portion 10m of the first region 10p and one end portion 10n of the second region 10q are joined to each other by the joining region 10r. The joining region 10r overlaps with the infrared receiver 30 in plan view. The joining region 10r is positioned, for example, in the center of the infrared receiver 30 in plan view.

The difference between the Seebeck coefficient of the first region 10p and the Seebeck coefficient of the second region 10q is not limited to a specific value. The difference is, for example, 10 uV/K or more. The Seebeck coefficient in the present specification means values at 25° C.

At the other end portion 10j of the first region 10p, the first wiring 40a is electrically connected to the first region 10p. The end portion 10j is positioned in the connected portion 10h of the electroconductive thermal insulating material 10a. At the other end portion 10k of the second region 10q, the second wiring 40b is electrically connected to the second region 10q. The end portion 10k is positioned in the connected portion 10i of the electroconductive thermal insulating material 10a. The first wiring 40a electrically connects the first region 10p of the electroconductive thermal insulating material 10a and the first signal processing circuit 50a to each other. The second wiring 40b electrically connects the second region 10q of the electroconductive thermal insulating material 10a and the second signal processing circuit 50b to each other. As shown in FIG. 10 and FIG. 11, in the infrared sensor 1a, the first signal processing circuit 50a and the second signal processing circuit 50b are two circuits independent of each other. The first signal processing circuit 50a and the second signal processing circuit 50b may be configured as a single circuit into which these circuits are integrated. The first signal processing circuit 50a and the second signal processing circuit 50b each can have a known configuration.

When infrared light is incident on the infrared receiver 30, the temperature of infrared receiver 30 increases. At this time, the temperature increase in the infrared receiver 30 becomes greater with increasing thermal insulation of the infrared receiver 30 from the substrate 21 that is a heat bath and from the members on the substrate 21. With the increased temperature, an electromotive force by the Seebeck effect is generated in the thermocouple element joined to the infrared receiver 30. The electromotive force generated is processed by the first signal processing circuit 50a and the second signal processing circuit 50b, and the infrared light is thus sensed. The infrared sensor 1a is capable of, for example, performing either or both of infrared intensity measurement and object temperature measurement.

The material for each of the first region 10p and the second region 10q is not limited to a specific material. The material for each of the first region 10p and the second region 10q may be a semiconductor rather than a metal. The medium that carries heat in a metal is not phonons, but is mainly free electrons. The semiconductor forming each of the first region 10p and the second region 10q is not limited to a specific semiconductor. The semiconductor may be a single-element semiconductor such as Si or Ge, or may be a compound semiconductor such as SiN, SiC, SiGe, GaAs, InAs, InSb, InP, GaN, or AlN. The semiconductor may be an oxide semiconductor such as $Fe_2O_3$, $VO_2$, $TiO_2$, or $SrTiO_3$. In the case where the materials for the first region 10p and the second region 10q are semiconductors, the semiconductors may be semiconductors having the same basic composition and being of different conduction types. The semiconductor conduction type can be adjusted by a known method such as doping. For example, the material for the first region 10p and the material for the second region 10q may be respectively a p-type semiconductor and an n-type semiconductor. In this case, the first region 10p is a p-type region, and the second region 10q is an n-type region. For example, the first region 10p and the second region 10q can be formed by doping a single-crystal Si layer. Since the processing technique for single-crystal Si has been established, the infrared sensor 1a is easily manufactured in such an example.

The material for each of the first region 10p and the second region 10q may be a single-crystal material in which atomic arrangement has long-range order, or may be a polycrystalline material or an amorphous material.

The substrate 21 is not limited to a specific form. The substrate 21 is typically made of a semiconductor. The semiconductor is, for example, Si. On the upper surface 22 of the substrate 21 made of Si, an oxide film may be formed. The oxide film is, for example, a $SiO_2$ film.

The infrared receiver 30 is not limited to a specific form. The infrared receiver 30 includes, for example, a silicon-based semiconductor. The silicon-based semiconductor is, for example, Si or SiGe.

The first wiring 40a and the second wiring 40b are each not limited to a specific form. The first wiring 40a and the second wiring 40b are each made of, for example, an impurity semiconductor, a metal, or a metal compound. The metal and the metal compound are respectively, for example, a metal such as Ti and a metal compound such as TiN, each of which has a low thermal conductivity.

The beam 10t extends to connect the infrared receiver 30 and each of the first wiring 40a and the second wiring 40b to each other, and connects the infrared receiver 30 and each of the first wiring 40a and the second wiring 40b to each other along the longitudinal direction of the beam 10t. In the infrared sensor 1a, macroscopic heat conduction occurs along the longitudinal direction of the beam 10t.

The application of the infrared sensor 1a is not limited to a specific application. In the infrared sensor 1a, since the electroconductive thermal insulating material 10a is produced in a state where crack growth is suppressed, the yield of the infrared sensor 1a is likely to be high. This facilitates reduction in the manufacturing cost of the infrared sensor 1a. In addition, since the infrared sensor 1a is likely to have a high sensitivity, the infrared sensor 1a is useful, for example, in providing high-precision thermal images at low cost in daily life. The infrared sensor 1a can be applied, for example, to applications such as body temperature measurement, day and night person recognition, evaluation of air-conditioning effects, and sensing of abnormal heating in electric devices.

The manufacturing method for the infrared sensor 1a is not limited to a specific method. The infrared sensor 1a can be manufactured, for example, by a combination of any of various thin film forming methods, various micromachining and pattern forming methods, and various reformulation methods. Examples of the thin film forming methods include chemical vapor deposition (CVD), sputtering, and vapor deposition. Examples of the micromachining and pattern forming methods include electron beam lithography, photolithography, block copolymer (BCP) lithography, and selective etching. Examples of the micromachining and pattern forming methods include amorphization, crystallization, and electroconductivity imparting, each of which uses a process such as doping or ion implantation.

Electron beam lithography is suitable for forming a phononic crystal structure having a periodicity P of about 100 nm or more and about 300 nm or less. BCP lithography is suitable for forming a phononic crystal structure having a periodicity P of about 1 nm or more and about 100 nm or less.

An example of the manufacturing method for the infrared sensor 1a will be described. FIG. 12A to FIG. 12E are cross-sectional views showing states in steps of the manufacturing method for the infrared sensor 1a, and correspond to the cross section taken along the line I-I in FIG. 10.

Figure 12A:
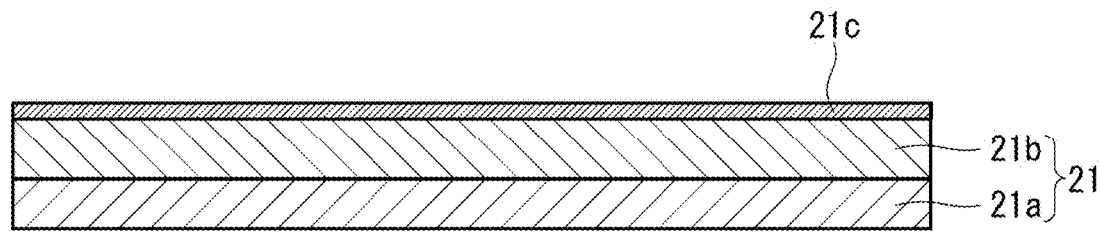
FIG. 12A is a cross-sectional view showing an example of a manufacturing method for the infrared sensor.

First, a Si substrate 21a is prepared. Next, the upper surface of the Si substrate 21a is thermally oxidized to form an insulating film 21b made of $SiO_2$. The substrate 21 is thus obtained. Subsequently, as shown in FIG. 12A, a beam layer 21c is formed on the upper surface of the insulating film 21b. The beam layer 21c can be formed, for example, by a known thin film forming method such as CVD. The material selected for the beam layer 21c is a material from which the beam 10t, the first region 10p, and the second region 10q can be formed. The material for the beam layer 21c is, for example, a material that changes into the first region 10p and the second region 10q by undergoing doping. A material selected for the beam layer 21c may be a material from which even the infrared receiver 30 can be formed. The beam layer 21c has a thickness of, for example, 10 nm or more and 500 nm or less.

Figure 12B:
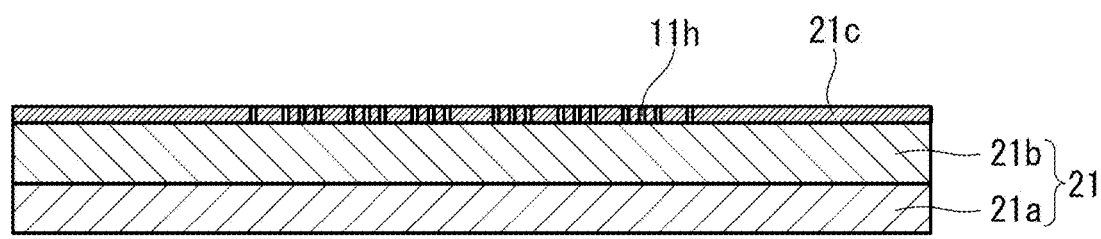
FIG. 12B is a cross-sectional view showing the example of the manufacturing method for the infrared sensor.

Next, as shown in FIG. 12B, the holes 11h are formed in the beam layer 21c so as to be arranged in plan view. For example, electron beam lithography can be used to form the holes 11h with a periodicity P of 100 nm or more and 300 nm or less, and BCP lithography can be used to form the holes 11h with a periodicity P of 1 nm or more and 100 nm or less.

Figure 12C:
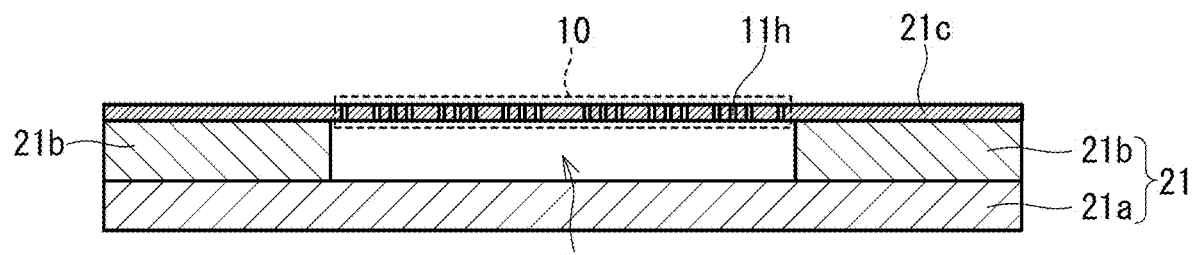
FIG. 12C is a cross-sectional view showing the example of the manufacturing method for the infrared sensor.

Next, as shown in FIG. 12C, the beam layer 21c and the insulating film 21b undergo photolithography and selective etching to construct the shape of the beam 10t and form the recess 23 as well. Owing to the formation of the recess 23, the portion of the beam layer 21c changed into the shape of the beam 10t becomes separated from the substrate 21.

Figure 12D:
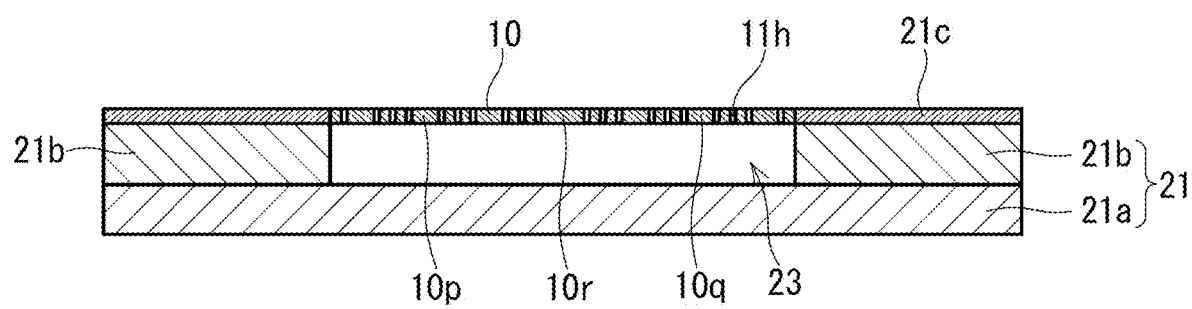
FIG. 12D is a cross-sectional view showing the example of the manufacturing method for the infrared sensor.

Next, as shown in FIG. 12D, the portion of the beam layer 21c changed into the shape of the beam 10t undergoes doping to form the first region 10p, the second region 10q, and the joining region 10r. A portion to be changed into the first region 10p is, for example, p-doped. A portion to be changed into the second region 10q is, for example, n-doped. For subsequent formation of the first wiring 40a and the second wiring 40b, the doping may be expanded to portions that overlap the substrate 21 in plan view.

Figure 12E:
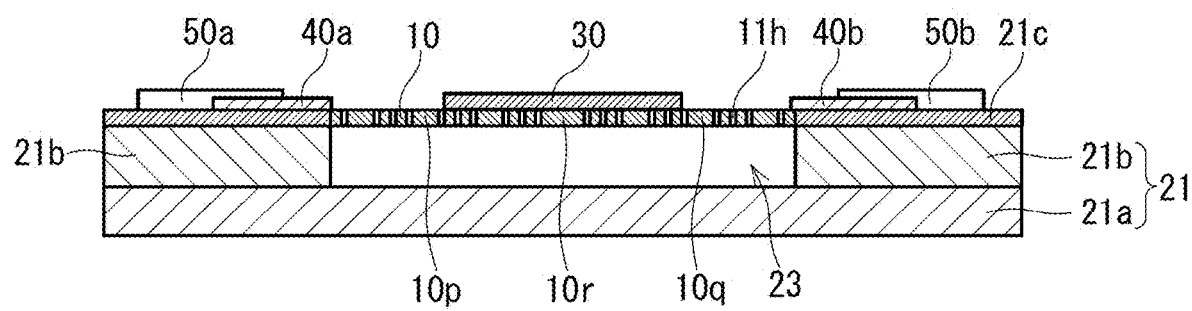
FIG. 12E is a cross-sectional view showing the example of the manufacturing method for the infrared sensor.

Next, as shown in FIG. 12E, the infrared receiver 30 is formed on the beam 10t so as to be in contact with the joining region 10r. Moreover, the first wiring 40a and the second wiring 40b are formed so as to be electrically connected to the first region 10p and the second region 10q, respectively. The first wiring 40a and the second wiring 40b are formed, for example, by photolithography and sputtering. Subsequently, the first signal processing circuit 50a and the second signal processing circuit 50b are formed on the substrate 21. Furthermore, necessary electrical connection is achieved, and the infrared sensor 1a is thus obtained. The infrared receiver 30, the first signal processing circuit 50a, and the second signal processing circuit 50b can be formed by a known method.

The infrared sensor 1a can function as an independent infrared sensor in principle. It is also possible to obtain an array structure in which a plurality of the infrared sensors 1a serving as individual pixels are arranged on the substrate 21. With the array structure, it is possible, for example, to image an object having a predetermined temperature or evaluate the intensity distribution of infrared radiation or of laser beam.

Embodiment 3

Figure 13:
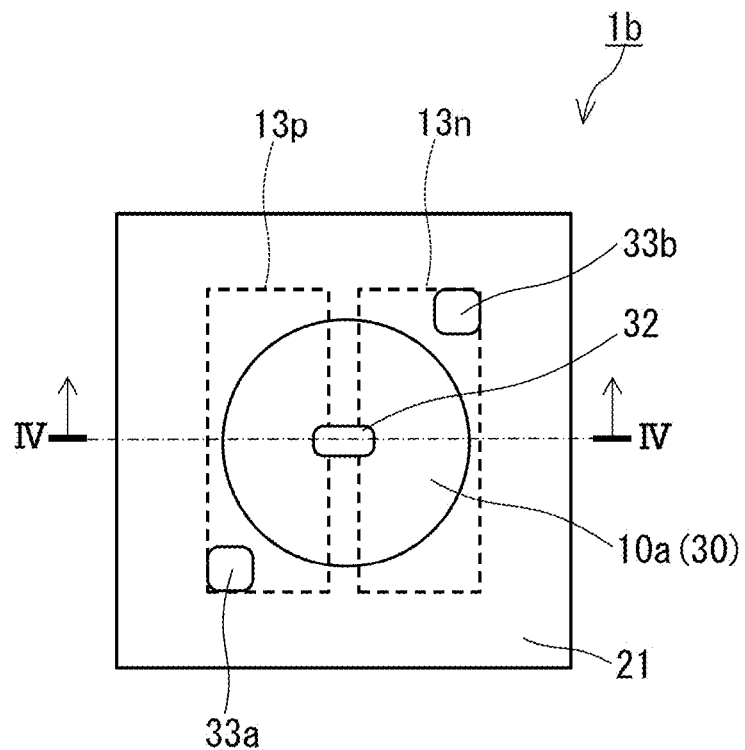
FIG. 13 is a plan view showing an infrared sensor of Embodiment 3.
Figure 14:
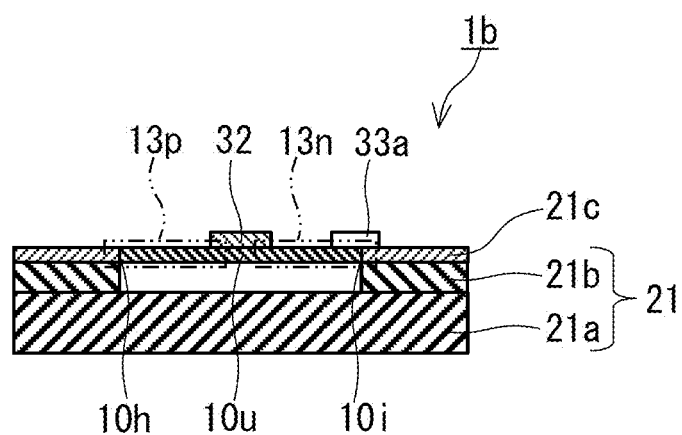
FIG. 14 is a cross-sectional view of the infrared sensor taken along a line IV-IV in FIG. 13.

FIG. 13 and FIG. 14 show an infrared sensor 1b according to Embodiment 3. FIG. 13 is a plan view of the infrared sensor 1b, and FIG. 14 is a cross-sectional view of the infrared sensor 1b taken along a line IV-IV in FIG. 13. The infrared sensor 1b is configured in the same manner as the infrared sensor 1a except portions otherwise particularly described. The components of the infrared sensor 1b that are identical to or correspond to the components of the infrared sensor 1a are assigned with the same reference numerals, and detailed description thereof is omitted. The description on the infrared sensor 1a also applies to the infrared sensor 1b unless they are technically contradictory to each other.

In the infrared sensor 1b, for example, the first domain 11 and the second domain 12 are formed throughout the separated portion 10u of the electroconductive thermal insulating material 10a. According to such a configuration, the phononic crystal is present throughout the separated portion 10u, thereby facilitating prevention of stress concentration in the neck portion of the phononic crystal caused by release of the residual stress in the bulk domain having no hole. Therefore, the electroconductive thermal insulating material 10a is even less prone to crack growth.

In the infrared sensor 1b, the electroconductive thermal insulating material 10a is formed not in the form of a beam but in the form of, for example, a membrane. As shown in FIG. 13 and FIG. 14, the electroconductive thermal insulating material 10a is formed, for example, in the form of a circular membrane, and is suspended in contact with a cavity formed in the center of the infrared sensor 1b.

The infrared sensor 1b is formed, for example, by using a silicon on insulator (SOI) substrate. The SOI substrate is a three-layer substrate composed of a silicon layer, a silicon oxide layer, and a silicon layer. In the infrared sensor 1b, a portion of a buried oxide layer, which is the silicon oxide layer of the SOI substrate, is removed to form a cavity, and the silicon layer above the cavity is suspended in the form of a membrane. The membrane-like electroconductive thermal insulating material 10a includes the first domains 11 each having a phononic crystal having the holes 11h. For example, vapor hydrofluoric acid passes through the holes 11h of the phononic crystal to come into contact with the silicon oxide layer positioned immediately below the phononic crystal. Thus, the silicon oxide layer is removed.

The electroconductive thermal insulating material 10a, for example, also serves as the infrared receiver 30. The refractive index of the membrane-like electroconductive thermal insulating material 10a and the center wavelength of the infrared wavelength band of a light receiving target are represented by n and λ, respectively. The thickness of the electroconductive thermal insulating material 10a is adjusted to, for example, λ/(4n). This enhances the infrared absorption efficiency of the electroconductive thermal insulating material 10a, allowing the electroconductive thermal insulating material 10a to also serve as the infrared receiver 30.

As shown in FIG. 13, the infrared sensor 1b includes, for example, a p-type region 13p, an n-type region 13n, a metal contact 32, a metal pad 33a, and a metal pad 33b. The left half of the membrane-like electroconductive thermal insulating material 10a is included in the p-type region 13p, and the right half of the electroconductive thermal insulating material 10a is included in the n-type region 13n. The metal contact 32 is formed on the center of the electroconductive thermal insulating material 10a in plan view, and connects the p-type region 13p and the n-type region 13n to each other. Since the first domain 11 and the second domain 12 are formed throughout the separated portion 10u as described above, a phononic crystal can also be present below the metal contact 32. A portion of the p-type region 13p is positioned beyond the membrane-like electroconductive thermal insulating material 10a. On the portion, the metal pad 33a is disposed. A portion of the n-type region 13n is positioned beyond the membrane-like electroconductive thermal insulating material 10a. On the portion, the metal pad 33b is disposed. The p-type region 13p, the n-type region 13n, the metal contact 32, the metal pad 33a, and the metal pad 33b constitute a thermopile. The metal contact 32 functions as the hot junction of the thermopile, and the metal pad 33a and the metal pad 33b function as the cold junction of the thermopile. Signals of a thermoelectromotive force generated from the temperature difference between the hot junction and the cold junction are extracted from the metal pad 33a and the metal pad 33b as signals for infrared sensing.

The infrared sensor 1b is advantageous, for example, in terms of structural stability. In the case where an electroconductive thermal insulating material is configured as the beam as in the infrared sensor 1a, the edge of the infrared receiver that is wider than that of the beam is likely to warp due to film stress. To suppress warpage of the infrared receiver, it is important to finely adjust and stabilize the conditions of a thin film forming process for forming the beam and the infrared receiver. When the infrared receiver warps at its free end and thus comes into contact with a different portion of the structure of the infrared sensor, heat of the infrared receiver escapes from the contact portion between the infrared receiver and the different portion. On the other hand, in the infrared sensor 1b, the periphery of the membrane-like electroconductive thermal insulating material 10a is restrained. Accordingly, although some deformation to a convex or concave shape occurs due to film stress, the free end does not warp unlike the free end that is not restrained in the infrared receiver 30 of the infrared sensor 1a. This requires no fine adjustment of the conditions of the thin film forming process.

Embodiment 4

Figure 15:
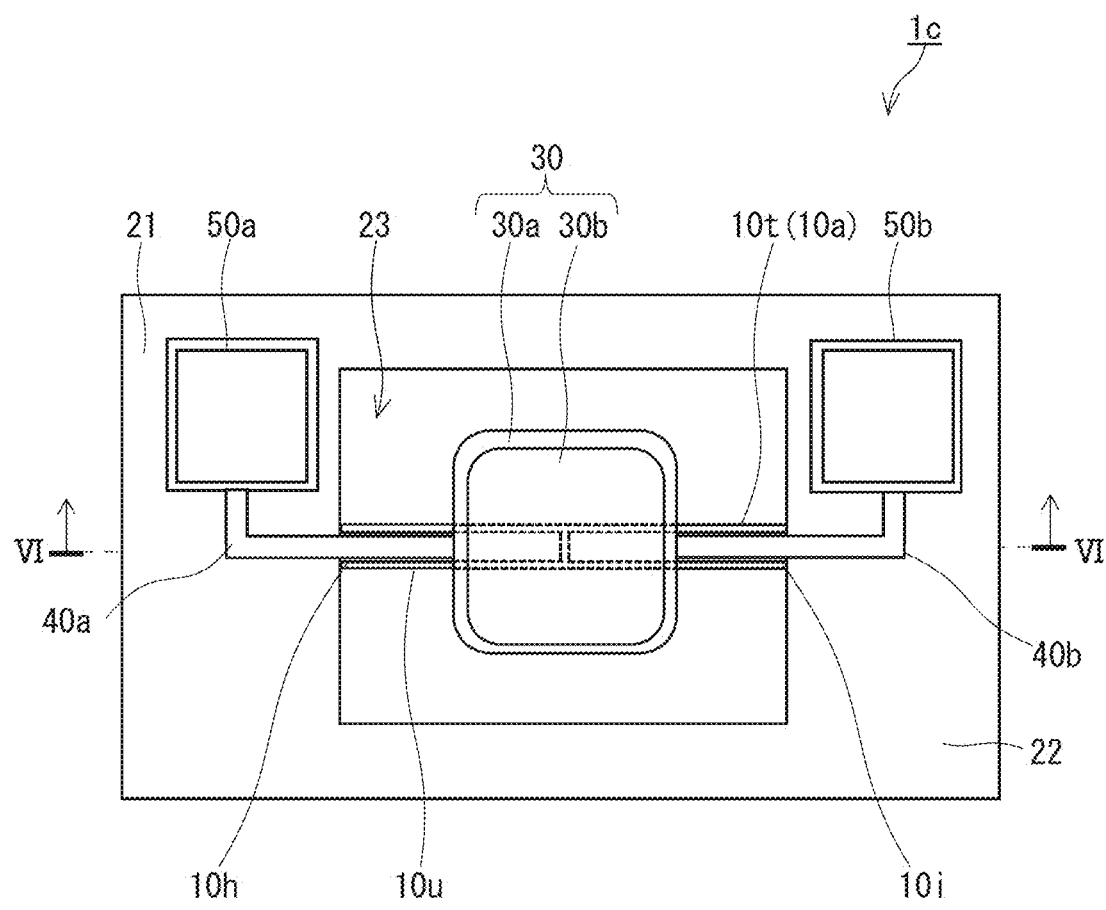
FIG. 15 is a plan view showing an infrared sensor of Embodiment 4.
Figure 16:
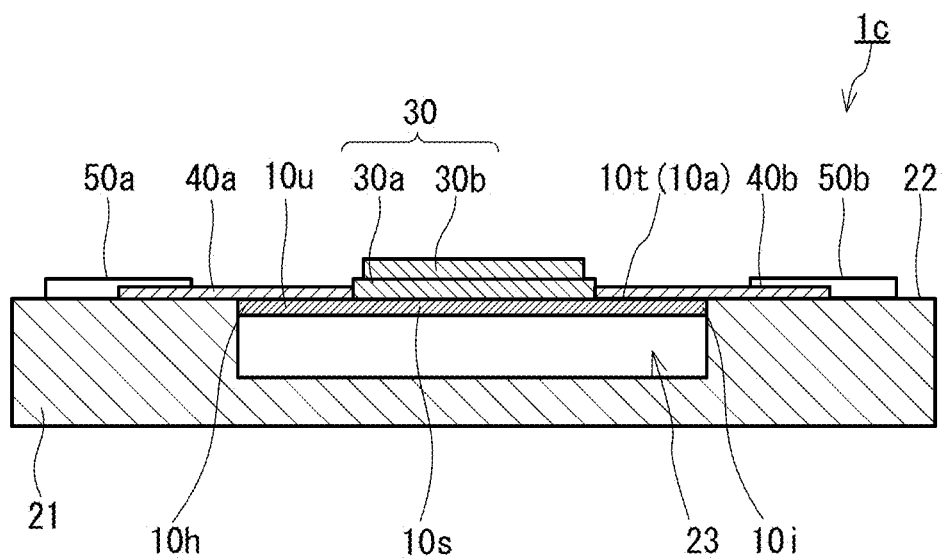
FIG. 16 is a cross-sectional view of the infrared sensor taken along a line VI-VI in FIG. 15.

FIG. 15 and FIG. 16 show an infrared sensor 1c according to Embodiment 4. FIG. 15 is a plan view of the infrared sensor 1c, and FIG. 16 is a cross-sectional view of the infrared sensor 1c taken along a line VI-VI in FIG. 15. The infrared sensor 1c is configured in the same manner as the infrared sensor 1a except portions otherwise particularly described. The components of the infrared sensor 1c that are identical to or correspond to the components of the infrared sensor 1a are assigned with the same reference numerals, and detailed description thereof is omitted. The description on the infrared sensor 1a also applies to the infrared sensor 1c unless they are technically contradictory to each other.

In the infrared sensor 1c, the infrared receiver 30 is, for example, a bolometer infrared receiver. In other words, the infrared sensor 1c is a bolometer infrared sensor. The infrared sensor 1c includes the substrate 21, the infrared receiver 30, the electroconductive thermal insulating material 10a, the first wiring 40a, the second wiring 40b, the first signal processing circuit 50a, and the second signal processing circuit 50b. The first wiring 40a and the second wiring 40b are electrically connected to the infrared receiver 30. In addition, the first wiring 40a is electrically connected to the first signal processing circuit 50a, and the second wiring 40b is electrically connected to the second signal processing circuit 50b.

In the infrared sensor 1c, the electroconductive thermal insulating material 10a forms the beam 10t. The first signal processing circuit 50a and the second signal processing circuit 50b are disposed on the substrate 21. The first wiring 40a and the second wiring 40b are disposed on the substrate 21 and the beam 10t.

The electroconductive thermal insulating material 10a has: the connected portions 10h and 10i both connected to the substrate 21; and the separated portion 10u separated from the substrate 21. The electroconductive thermal insulating material 10a has, at its both end portions, the connected portions 10h and 10i. In the separated portion 10u, the infrared receiver 30 and the electroconductive thermal insulating material 10a are joined to each other. The infrared receiver 30 is joined to the upper surface of the electroconductive thermal insulating material 10a. The joining position between the infrared receiver 30 and the electroconductive thermal insulating material 10a is between the both end portions of the electroconductive thermal insulating material 10a, more specifically, near the center of the electroconductive thermal insulating material 10a. The infrared receiver 30 is supported by the electroconductive thermal insulating material 10a having the separated portion 10u in a state where the infrared receiver 30 is separated from the substrate 21. The electroconductive thermal insulating material 10a forms a double-supported beam.

The substrate 21 has, in an upper surface 22, a recess 23 that is open. In plan view, the recess 23 has a larger area than the infrared receiver 30 has. In addition, in plan view, the infrared receiver 30 is surrounded by the outer edge of the recess 23. The recess 23 is positioned between the infrared receiver 30 together with the beam 10t and the surface of the substrate 21. The infrared receiver 30 and the beam 10t are suspended above the recess 23 of the substrate 21. The both end portions in the longitudinal direction of the beam 10t are, for example, connected to the side walls of the recess 23.

The electroconductive thermal insulating material 10a includes, between its joined portion joined to the infrared receiver 30 and each of its connected portions 10h and 10i, the first domain 11 and the second domain 12. Accordingly, the electroconductive thermal insulating material 10a can form the beam 10t having a high mechanical resistance, electroconductivity, and thermal insulation. Consequently, in the infrared sensor 1b as in the infrared sensor 1a, crack growth through the hole 11h of the phononic crystal is suppressed, and a high infrared sensing sensitivity is likely to be exhibited.

When infrared light is incident on the infrared receiver 30, the temperature of the infrared receiver 30 increases. At this time, the temperature increase in the infrared receiver 30 becomes greater with increasing thermal insulation of the infrared receiver 30 from the substrate 21 that is a heat bath and from the members on the substrate 21. The infrared receiver 30 varies in electrical resistance with its increased temperature. The variation in electrical resistance is processed by the first signal processing circuit 50a and the second signal processing circuit 50b, and the infrared light is thus sensed. The infrared sensor 1c is capable of performing either or both of infrared intensity measurement and object temperature measurement.

In the infrared sensor 1c, the first wiring 40a and the second wiring 40b each have a section separated from the substrate 21. The section of the first wiring 40a is positioned between the connected portion of the first wiring 40a to the infrared receiver 30 and the first signal processing circuit 50a. The section of the second wiring 40b is positioned between the connected portion of the second wiring 40b to the infrared receiver 30 and the second signal processing circuit 50b. The respective sections of the first wiring 40a and the second wiring 40b are in contact with the surface of the beam 10t. The respective sections of the first wiring 40a and the second wiring 40b may be partial regions of the beam 10t. Such sections can be formed, for example, by forming the partial regions of the beam 10t from an impurity semiconductor.

In the infrared sensor 1c, either or both of the first wiring 40a and the second wiring 40b may have a phononic crystal. According to such a configuration, heat conduction in either or both of the first wiring 40a and the second wiring 40b is suppressed. Consequently, the infrared receiving sensitivity of the infrared sensor 1c can be further enhanced.

In the case where either or both of the first wiring 40a and the second wiring 40b have a phononic crystal, holes are formed in them, for example. The holes may be formed to be aligned with the holes 11h of the electroconductive thermal insulating material 10a. According to such a configuration, the infrared receiving sensitivity of the infrared sensor 1c can be further enhanced. In addition, phononic crystal formation can be simultaneously performed on the electroconductive thermal insulating material 10a and either or both of the first wiring 40a and the second wiring 40b. This facilitates the manufacture of the infrared sensor 1c.

As shown in FIG. 15 and FIG. 16, the infrared receiver 30 includes, for example, a variable resistance layer 30a and an infrared absorbing layer 30b. The infrared absorbing layer 30b is disposed on the variable resistance layer 30a. The infrared absorbing layer 30b, for example, defines the outermost layer of the infrared receiver 30.

The material for the variable resistance layer 30a is not limited to a specific material. Typically, a material having a large variation in electrical resistance with respect to a temperature variation forms the variable resistance layer 30a. The material for the variable resistance layer 30a is, for example, Pt, amorphous Si, or vanadium oxide. These materials each have a high temperature coefficient of resistance.

The material for the infrared absorbing layer 30b is not limited to a specific material. The material for the infrared absorbing layer 30b may be a metal such as Ti, Cr, Au, Al, or Cu, an oxide such as $SiO_2$, or a nitride such as TiN or SiN. The infrared absorbing layer 30b may have electroconductivity. In this case, the infrared receiver 30 includes, for example, an insulating layer between the variable resistance layer 30a and the infrared absorbing layer 30b.

The infrared sensor 1c can be manufactured by known methods including thin film forming methods such as sputtering and vapor deposition and micromachining methods such as photolithography and selective etching. Moreover, the infrared sensor 1c can be manufactured by applying the above-described manufacturing method for the infrared sensor 1a.

INDUSTRIAL APPLICABILITY

The electroconductive thermal insulating material of the present disclosure can be used for a variety of applications including infrared sensor applications and phononic crystal applications.

What is claimed is:
1. An infrared sensor comprising:
a substrate;
an infrared receiver; and
an electroconductive thermal insulating material, wherein the electroconductive thermal insulating material comprises:
first domains each having a phononic crystal, the phononic crystal having holes arranged in plan view;

at least one second domain formed around the first domain in plan view and having no hole,
a connected portion connected to at least one selected from the group consisting of the substrate and a member on the substrate; and
a separated portion separated from the substrate, wherein
the first domains are divided from each other by the second domain,
in plan view, the first domain has a substantially polygonal shape in which at least one interior angle is greater than 90°,
the infrared receiver is joined to the separated portion of the electroconductive thermal insulating material,
the infrared receiver is supported by the electroconductive thermal insulating material in a state where the infrared receiver is separated from the substrate, and
the electroconductive thermal insulating material includes, between a joined portion thereof joined to the infrared receiver and the connected portion, the first domain and the second domain.

2. The infrared sensor according to claim 1, wherein
the infrared receiver is a thermopile infrared receiver,
the electroconductive thermal insulating material has:
a first region having a first Seebeck coefficient;
a second region having a second Seebeck coefficient different from the first Seebeck coefficient; and
a joining region joining the first region and the second region to each other, and
the infrared receiver is joined to the joining region of the electroconductive thermal insulating material.

3. The infrared sensor according to claim 1, wherein
the infrared receiver is a bolometer infrared receiver, and
the infrared sensor comprises:
a first wiring and a second wiring both electrically connected to the infrared receiver;
a first signal processing circuit electrically connected to the first wiring; and
a second signal processing circuit electrically connected to the second wiring.

4. The infrared sensor according to claim 1, wherein
the first domain and the second domain are formed throughout the separated portion of the electroconductive thermal insulating material.

5. The infrared sensor according to claim 1, wherein
in plan view, the first domain has a shape capable of tessellation.

6. The infrared sensor according to claim 1, wherein
in plan view, the first domain has a substantially obtuse triangular shape, a substantially parallelogrammic shape, or a substantially parallel hexagonal shape.

7. The infrared sensor according to claim 1, wherein
in plan view, the first domain has a substantially hexagonal shape, and
the first domains are arranged in a substantially honeycomb pattern.

8. The infrared sensor according to claim 1, wherein
the holes are arranged with a periodicity P in plan view, and
the first domain has an area of $25 P^2$ or more in plan view.

9. The infrared sensor according to claim 1, wherein
the second domain includes:
a base layer formed to be flush with the first domain; and
a reinforcing layer disposed on the base layer.

* * * * *